(12) United States Patent
Salunkhe et al.

(10) Patent No.: US 11,090,595 B2
(45) Date of Patent: Aug. 17, 2021

(54) ADJUSTABLE FILTER TRACK FOR HVAC SYSTEM

(71) Applicant: Johnson Controls Technology Company, Auburn Hills, MI (US)

(72) Inventors: Ravindra B. Salunkhe, Satara (IN); Bhushan C. Kadu, Pune (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 224 days.

(21) Appl. No.: 16/289,294

(22) Filed: Feb. 28, 2019

(65) Prior Publication Data

US 2020/0269173 A1 Aug. 27, 2020

Related U.S. Application Data

(60) Provisional application No. 62/811,346, filed on Feb. 27, 2019.

(51) Int. Cl.
| | |
|---|---|
| *B01D 46/00* | (2006.01) |
| *F24F 3/16* | (2021.01) |
| *B01D 46/12* | (2006.01) |
| *F24F 8/10* | (2021.01) |

(52) U.S. Cl.
CPC ....... *B01D 46/0005* (2013.01); *B01D 46/002* (2013.01); *B01D 46/12* (2013.01); *F24F 8/10* (2021.01); *B01D 2267/30* (2013.01); *B01D 2267/60* (2013.01); *B01D 2277/30* (2013.01); *B01D 2279/50* (2013.01)

(58) Field of Classification Search
CPC .. B01D 46/002; B01D 46/0005; F24F 3/1603
USPC .......................................................... 55/481
See application file for complete search history.

(56) References Cited

U.S. PATENT DOCUMENTS

| | | | |
|---|---|---|---|
| 6,126,708 A | 10/2000 | Mack et al. | |
| 6,502,909 B1 | 1/2003 | Swilik, Jr. et al. | |
| 8,048,186 B2 | 11/2011 | Mann et al. | |
| 8,105,409 B2 | 1/2012 | Mann et al. | |
| 8,211,198 B2 * | 7/2012 | Weber ................ | B01D 46/0005 55/496 |
| 8,382,874 B2 | 2/2013 | Greist et al. | |
| 8,388,717 B2 | 3/2013 | Livingstone et al. | |

(Continued)

FOREIGN PATENT DOCUMENTS

| | | |
|---|---|---|
| CN | 203928350 U | 11/2014 |
| CN | 204535027 U | 8/2015 |
| WO | 01/50072 A1 | 7/2001 |

*Primary Examiner* — Robert A Hopkins
(74) *Attorney, Agent, or Firm* — Fletcher Yoder, P.C.

(57) ABSTRACT

An adjustable filter track system for a heating, ventilation, and/or air conditioning (HVAC) system includes a filter track including a guideway and a bracket that form a recess configured to receive a first filter in a first configuration of the adjustable filter track system, a plurality of receptacles formed in the guideway and aligned along a length of the guideway, and a plurality of inserts, where, in a second configuration of the adjustable filter track system, each insert of the plurality of inserts is configured to be disposed in a corresponding receptacle of the plurality of receptacles and extend outwardly from the guideway to secure a second filter between the plurality of inserts and the bracket, where the second filter has a different thickness than the first filter.

25 Claims, 24 Drawing Sheets

(56) References Cited

U.S. PATENT DOCUMENTS

| | | |
|---|---|---|
| 8,647,405 B2 | 2/2014 | Gray, Jr. et al. |
| 8,784,528 B2 | 7/2014 | Gorman |
| 9,114,341 B2 | 8/2015 | Gorman |
| 2003/0211823 A1 | 11/2003 | Wolf et al. |
| 2005/0204922 A1 | 9/2005 | Wu et al. |
| 2017/0274307 A1 | 9/2017 | Hugues et al. |
| 2017/0363318 A1 | 12/2017 | White et al. |

* cited by examiner

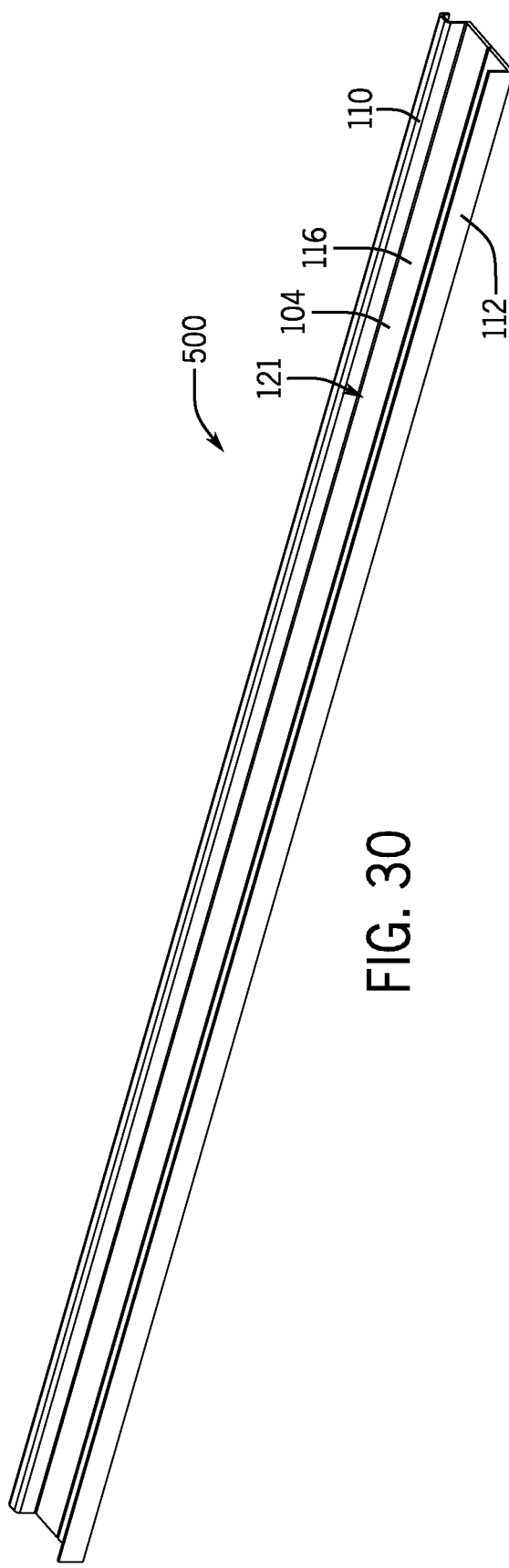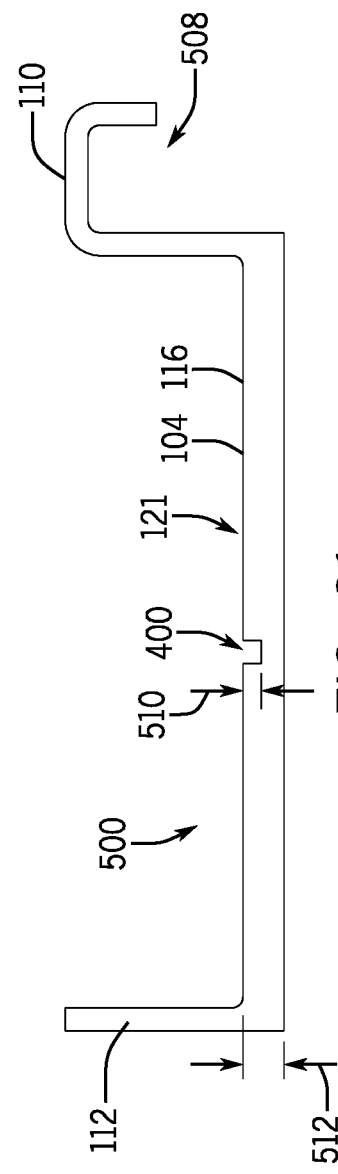

ADJUSTABLE FILTER TRACK FOR HVAC SYSTEM

CROSS REFERENCE TO RELATED APPLICATIONS

This application claims priority from and the benefit of U.S. Provisional Application Ser. No. 62/811,346, entitled "ADJUSTABLE FILTER TRACK FOR HVAC SYSTEM," filed Feb. 27, 2019, which is hereby incorporated by reference in its entirety for all purposes.

BACKGROUND

The present disclosure relates generally to a heating, ventilation, and/or air conditioning (HVAC) system, and more particularly, to an adjustable filter track for an HVAC system.

HVAC systems are utilized in residential, commercial, and industrial environments to control environmental properties, such as temperature and humidity, for occupants of the respective environments. The HVAC system may control the environmental properties through control of an air flow delivered to the environment. In some cases, the HVAC system may include a filter that is configured to remove particulates and/or contaminants that may be present in an air flow drawn into a housing of the HVAC system from a surrounding environment. The filter may enable the air flow ultimately flowing across components of the HVAC system to contain a reduced amount of particulates and/or contaminants, which may prolong an operating life of the HVAC system and/or reduce an amount of maintenance performed on the HVAC system. Unfortunately, filter tracks that secure the filter within the HVAC system may be rigidly manufactured to fit a specific size of filter.

DRAWINGS

FIG. 30 is a perspective view of a terminal bracket of the third embodiment of the adjustable filter track of FIGS. 22-25, in accordance with an aspect of the present disclosure;

FIG. 31 is a cross-sectional side view of an embodiment of the terminal bracket of the third embodiment of the adjustable filter track of FIGS. 22-25, in accordance with an aspect of the present disclosure;

Figure 32:
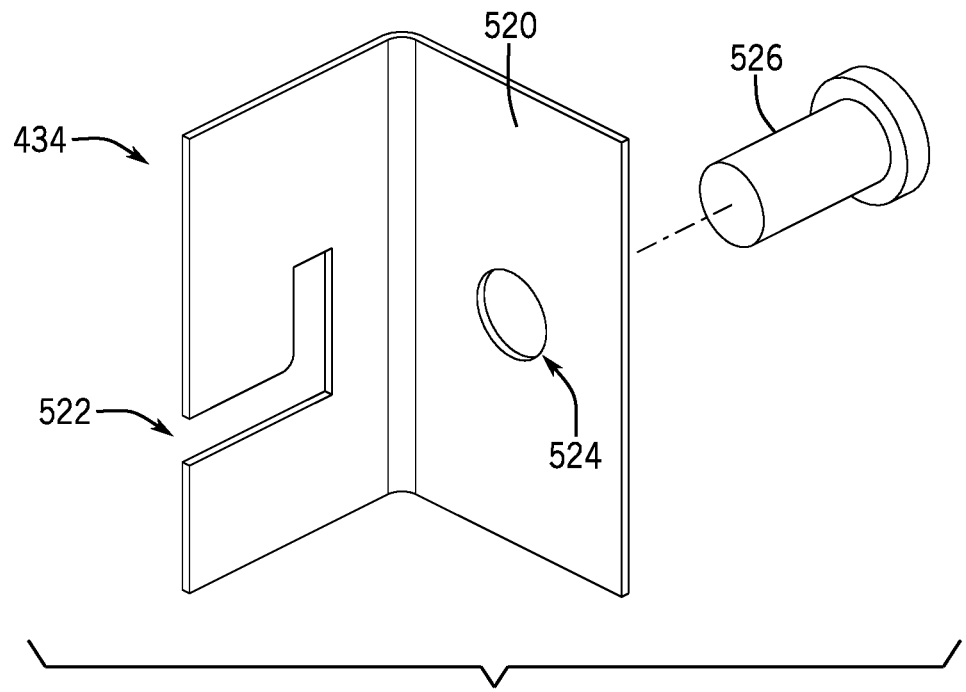
Figure 33:
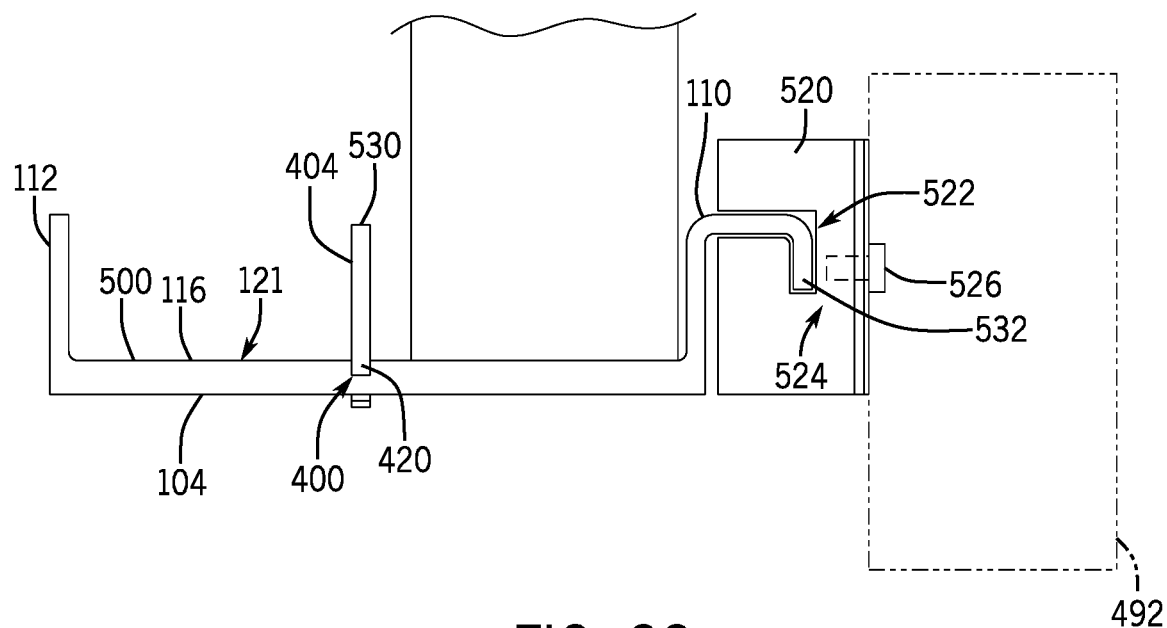

FIG. 32 is a perspective view of an embodiment of a lock plate configured to be coupled to the terminal bracket of the third embodiment of the adjustable filter track of FIGS. 22-25, in accordance with an aspect of the present disclosure; and FIG. 33 is a cross-sectional side view of an embodiment of the lock plate of FIG. 32 and an insert of the plurality of inserts coupled to the terminal bracket of the third embodiment of the adjustable filter track of FIGS. 22-25, in accordance with an aspect of the present disclosure.

SUMMARY

In one embodiment of the present disclosure, an adjustable filter track system for a heating, ventilation, and/or air conditioning (HVAC) system includes a filter track including a guideway and a bracket that form a recess configured to receive a first filter in a first configuration of the adjustable filter track system, a plurality of receptacles formed in the guideway and aligned along a length of the guideway, and a plurality of inserts, where, in a second configuration of the adjustable filter track system, each insert of the plurality of inserts is configured to be disposed in a corresponding receptacle of the plurality of receptacles and extend outwardly from the guideway to secure a second filter between the plurality of inserts and the bracket, where the second filter has a different thickness than the first filter.

In another embodiment of the present disclosure, an adjustable filter track system includes a plurality of filter tracks each including a guideway disposed between a first bracket and a second bracket, where the first bracket and the second bracket extend in a direction transverse to the guideway and are configured to retain a first filter therebetween in a first configuration of the adjustable filter track system, a plurality of receptacles formed in corresponding guideways of the plurality of filter tracks, and a plurality of inserts, where, in a second configuration of the adjustable filter track system, each insert of the plurality of inserts is configured to be disposed in a corresponding receptacle of the plurality of receptacles and extend outwardly from the corresponding guideway of the plurality of filter tracks in the direction transverse to the corresponding guideway to secure a second filter between the respective insert and the corresponding first bracket.

In a further embodiment of the present disclosure, an adjustable filter track system includes a plurality of inserts, each insert of the plurality of inserts having a securement feature configured to facilitate coupling of the respective insert to corresponding receptacles of a plurality of receptacles extending through a guideway of a filter track, where each insert of the plurality of inserts is configured to extend outwardly from the guideway of the filter track in a direction transverse to the guideway to secure a filter between the respective insert and a bracket of the filter track.

Other features and advantages of the present application will be apparent from the following, more detailed description of the embodiments, taken in conjunction with the accompanying drawings which illustrate, by way of example, the principles of the application.

DETAILED DESCRIPTION

The present disclosure is directed to an adjustable filter track configured to secure and/or otherwise support filters having varying sizes or thicknesses. Heating, ventilation, and/or air conditioning (HVAC) systems may include filters that reduce an amount of particulates and/or contaminants that may be present within a supply air flow before directing the air flow toward components, such as a heat exchanger, of the HVAC system. Removal of the particulates and/or contaminants from the air flow may increase an operating life of the components of the HVAC system, increase an efficiency of the HVAC system, improve a quality of air flow used to condition a space, and/or reduce an amount of maintenance performed on the HVAC system. Existing filter tracks that secure a filter within the HVAC system may be manufactured to secure filters having one particular size. In such cases, a filter track of one type must be removed and replaced with another filter track of another type in order to switch between filters having different sizes. Additionally, manufacturing filter tracks for specifically-sized filters may increase costs by requiring multiple filter tracks to be produced and made available for sale. Further still, switching between various filter tracks may be time consuming and relatively complex.

Accordingly, embodiments of the present disclosure are directed to an adjustable filter track system that may include a plurality of configurations in order to receive and secure a plurality of different sized filters. For example, in a first embodiment of the present disclosure, the adjustable filter track system may include a filter track having a first bracket, a second bracket, and a guideway disposed between the first bracket and the second bracket. The first bracket, the second bracket, and the guideway may form a recess configured to receive a filter. The filter track may be coupled to a first coupling feature of a strut of a frame in a first configuration to secure a first filter having a first thickness within the filter track. The filter track may also be coupled to a second coupling feature of the strut in a second configuration to secure a second filter having a second thickness, different than the first thickness, within the filter track. In some embodiments, the strut includes a first panel, a second panel opposite the first panel, and a third panel coupling the first panel and the second panel to one another. The strut may thus form an open-sided structure that extends in a direction transverse to a length of the filter track. The first coupling feature of the strut may be included on the first panel of the strut, and the second coupling feature of the strut may be included on the second panel of the strut. Accordingly, a width of the recess formed by the filter track may be adjusted by switching between the first configuration and the second configuration, which enables the adjustable filter track to secure the first filter and the second filter.

In a second embodiment of the present disclosure, the adjustable filter track system may include a filter track and an adjustable angle bracket rotatably coupled to a guideway of the filter track. The adjustable angle bracket is configured to rotate about an axis from a first configuration position that secures a first filter having a first thickness within the filter bracket to a second position configured to secure a second filter having a second thickness, different than the first thickness, within the filter bracket.

In a third embodiment of the present disclosure, the adjustable filter track system includes a filter track having a guideway and a plurality of receptacles formed within the guideway. A plurality of inserts are configured to be disposed in corresponding receptacles of the plurality of receptacles to secure a first filter having a first thickness within the filter track. The plurality of inserts are configured to be removably coupled to the plurality of receptacles, such that when the plurality of inserts is removed from the plurality of receptacles, the adjustable filter track system is configured to secure a second filter having a second thickness, different than the first thickness, within the filter track.

While the present disclosure discusses three embodiments of the adjustable filter track system, it should be recognized that features from any of the embodiments may be used separately or in combination with one another to form any suitable adjustable filter track system. In any case, the adjustable filter track system is configured to receive and secure a plurality of filters having varying thicknesses within the filter track. As such, manufacturing of multiple different sized filter tracks may be avoided and/or eliminated to reduce costs. Further, adjusting the adjustable filter track system between various configurations may be simplified, thereby reducing an amount of time involved in transitioning between filters having different thicknesses.

Figure 1:
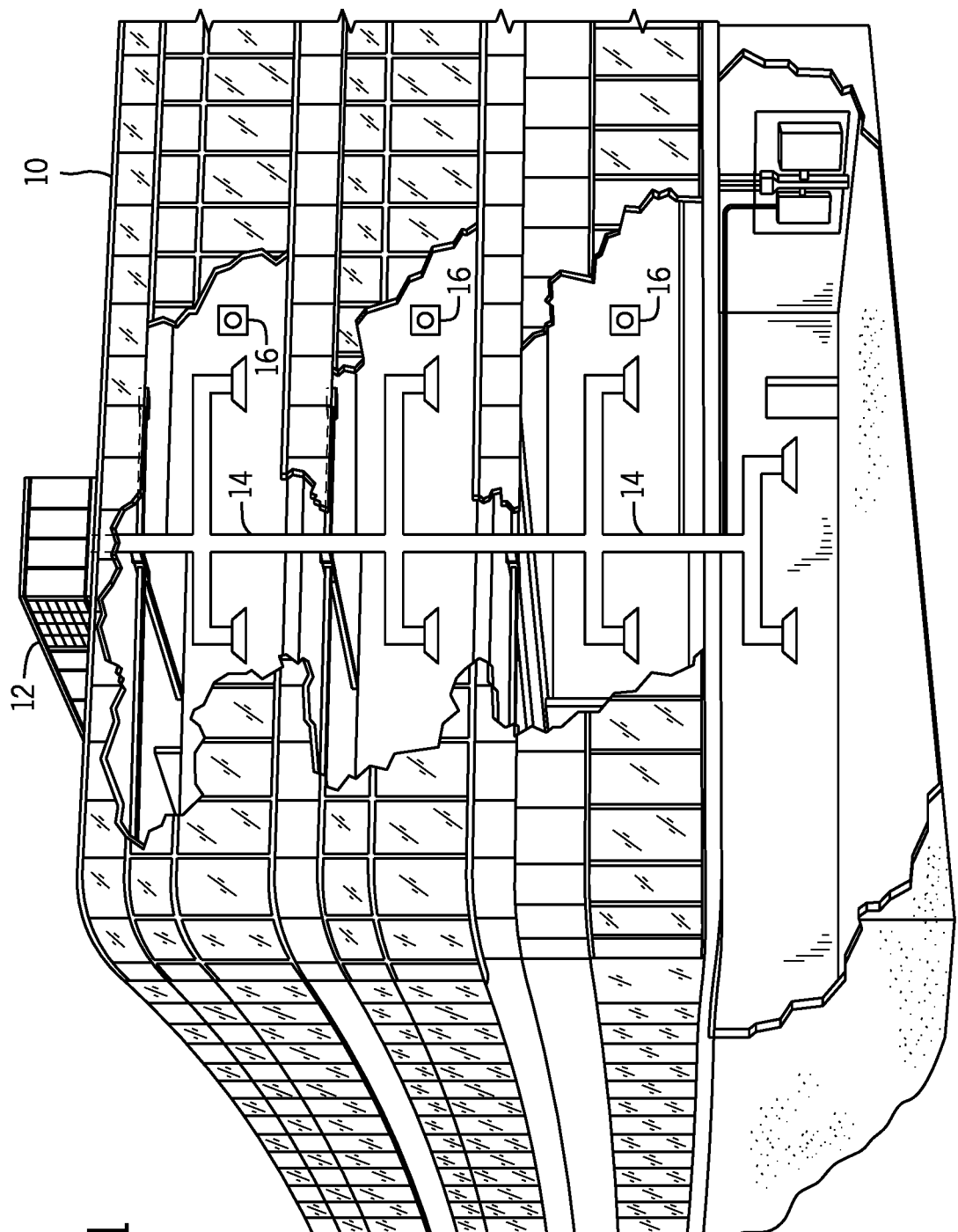
FIG. 1 is a schematic of an embodiment of an HVAC system for building environmental management that includes an HVAC unit, in accordance with an aspect of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
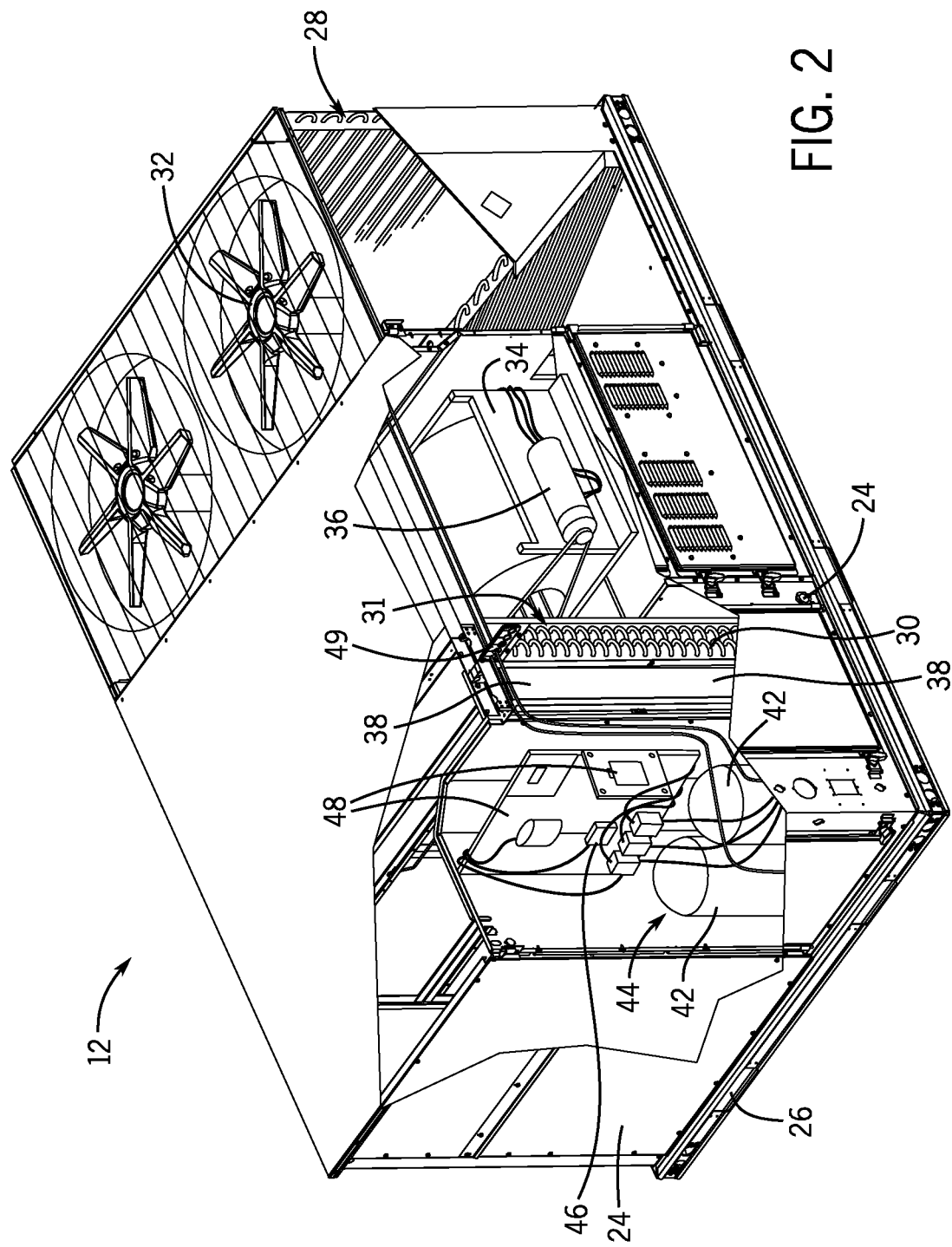
FIG. 2 is a perspective view of an embodiment of an HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multi-channel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
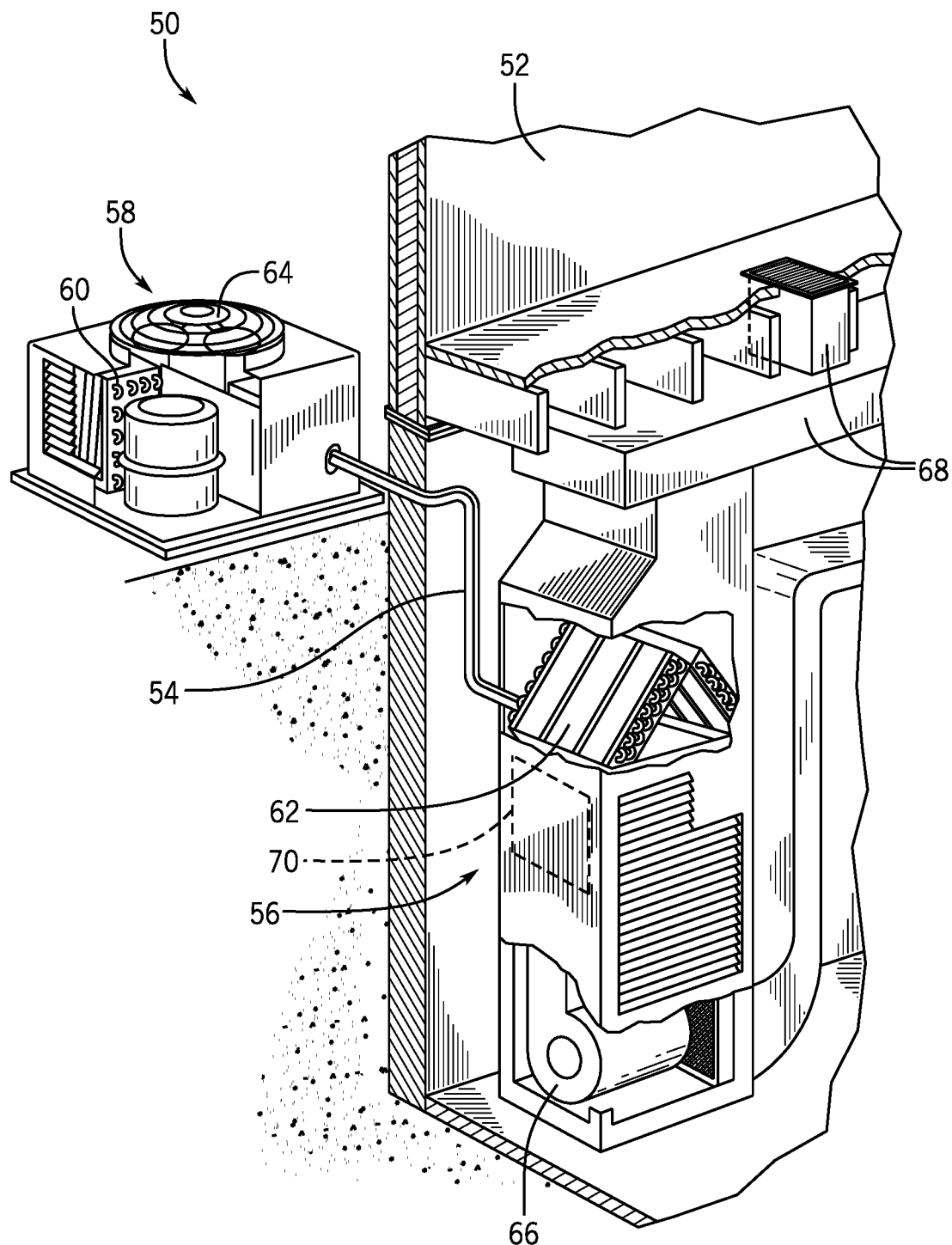
FIG. 3 is a cutaway perspective view of an embodiment of a split, residential HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
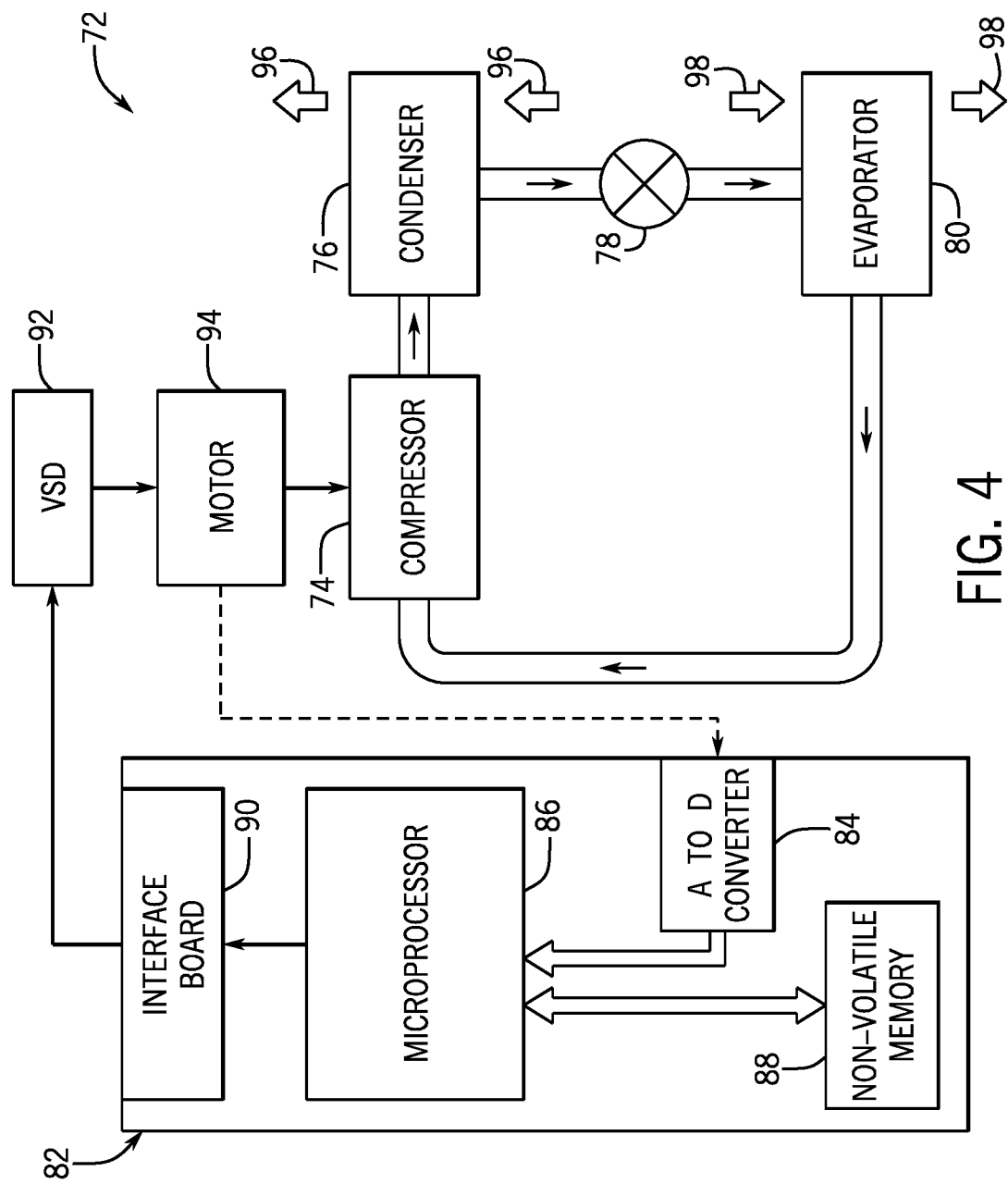
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As set forth above, embodiments of the present disclosure are directed to an improved filter track that may be adjusted to secure filters having a plurality of different sizes. For example, a filter, such as the filter 38, may be disposed upstream of various components of an HVAC system, such as the heat exchanger 30, with respect to an air flow directed through the HVAC system. The filter removes particulates and/or contaminants from the air flow, which may increase a heat transfer efficiency between the air flow and the refrigerant flowing through components of the HVAC system and may improve a quality of the air flow before the air flow is supplied to a conditioned space serviced by the HVAC system. Existing filter tracks that secure filters within the HVAC system may be manufactured to secure filters having one particular thickness or size. As such, switching between filters of different sizes involves removal and replacement of the filter track. Utilizing multiple filter tracks for different sizes of filters may increase manufacturing costs of the HVAC system. Accordingly, embodiments of the present disclosure are directed to an adjustable filter track system that may include a plurality of configurations that enable a filter track to secure filters having various sizes and/or thicknesses. The present disclosure discusses three embodiments of the adjustable filter track system. It should be understood that features of any of the three embodiments may be used separately or in combination with one another to form any suitable adjustable filter track system.

First Embodiment of the Adjustable Filter Track System

Figure 5:
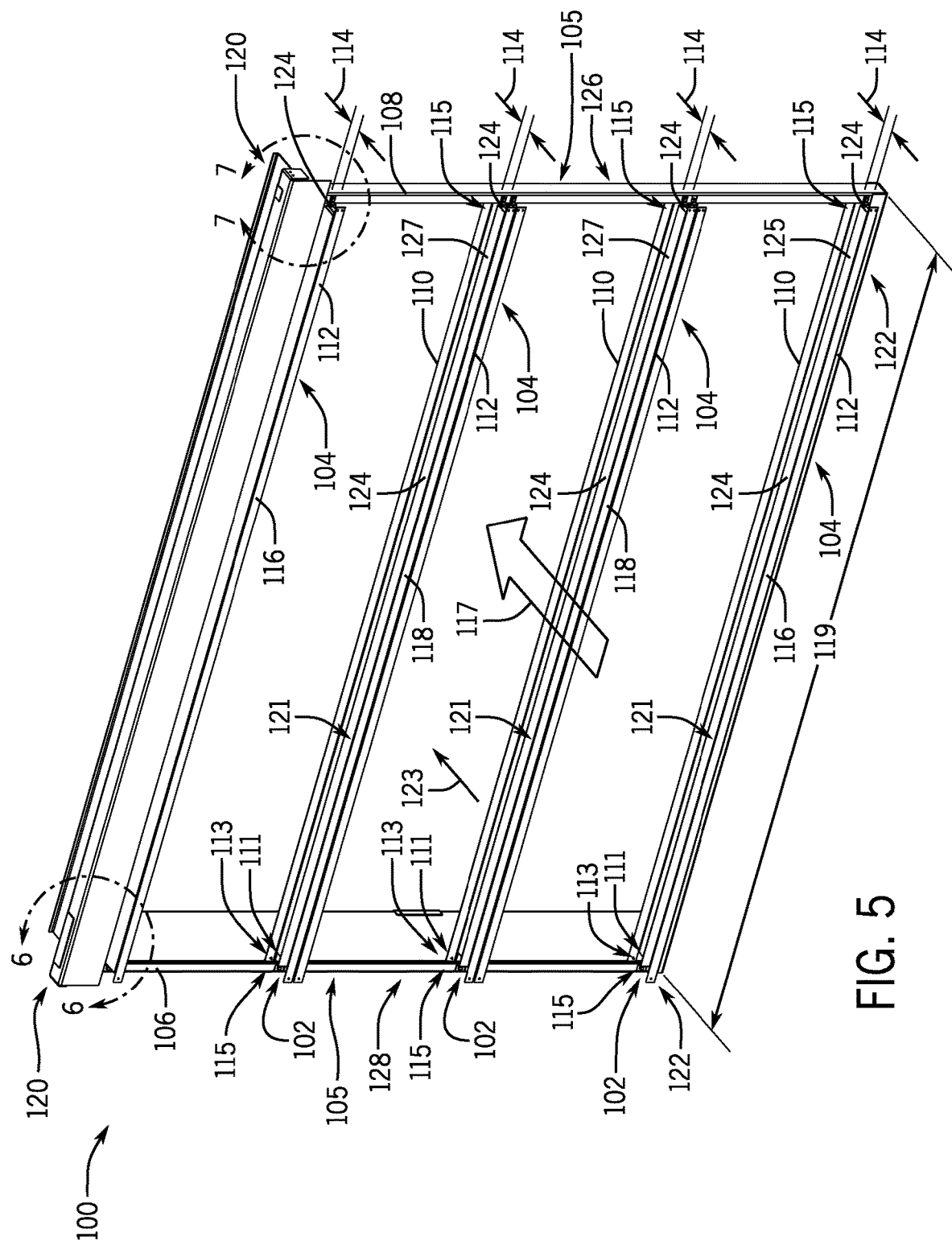
FIG. 5 is a perspective view of a first embodiment of an adjustable filter track configured to receive and secure a plurality of filters having different sizes or thicknesses, in accordance with an aspect of the present disclosure.

For instance, FIG. 5 is a perspective view of an embodiment of an adjustable filter track system 100. Embodiments of the adjustable filter track system 100 may be implemented with any suitable HVAC system, such as the HVAC unit 12 of FIG. 2, the heating and cooling system 50 of FIG. 3, or any other HVAC system in which filtering of an air flow is desired. As shown in the illustrated embodiment of FIG. 5, the adjustable filter track system 100 includes a plurality of recesses 102 formed by a plurality of filter tracks 104 coupled to a frame 105 having a first strut 106 and a second strut 108. In some embodiments, the plurality of filter tracks 104, the first strut 106, and the second strut 108 may be formed or include a metallic material, such as sheet metal, aluminum, copper, or another suitable metal. In other embodiments, the plurality of filter tracks 104, the first strut 106, and the second strut 108 may be formed or include another suitable material, such as a polymeric material.

The plurality of filter tracks 104 may each include a first bracket 110 having a first coupling feature 111, such as first receptacles, and a second bracket 112. The first coupling feature 111 of the first bracket 110 is configured to couple one of the plurality of filter tracks 104 to a second coupling feature 113 of each of the struts 106, 108 and to a third coupling feature 115 of each of the struts 106, 108 in a first configuration and a second configuration of the adjustable filter track system 100, respectively. The plurality of recesses 102 may include different depths 114, or widths, when positioned in the first configuration as compared to the second configuration. For example, the depth 114 of the plurality of recesses 102 in the first configuration may have a first magnitude to enable a filter having a first thickness to be secured and disposed within the plurality of recesses 102. Additionally, the depth 114 of the plurality of recesses 102 in the second configuration may have a second magnitude to enable a filter having a second thickness, different than the first thickness, to be secured and disposed within the plurality of recesses 102. In other words, the depth 114 of the plurality of recesses 102 may be adjusted by switching between the first configuration and the second configuration via coupling the first bracket 110 to the second coupling feature 113 of the struts 106, 108 in the first configuration and via coupling the first bracket 110 to the third coupling feature 115 of the struts 106, 108 in the second configuration.

In some embodiments, the plurality of filter tracks 104 may include terminal filter tracks 116 and intermediate filter tracks 118. For example, the terminal filter tracks 116 may be positioned at a first end 120 and a second end 122 of each of the first strut 106 and the second strut 108. The intermediate filter tracks 118 may be positioned between the first end 120 and the second end 122 and may be configured to partially form multiple recesses 102. In other words, the intermediate filter tracks 118 may be spaced between the ends 120, 122 and are configured to secure two filters disposed in adjacent recesses 102. The terminal filter tracks 116 positioned at the ends 120, 122 may be configured to at least partially form one of the recesses 102, and thus, may be configured to receive and/or secure a single filter.

In some embodiments, the adjustable filter track system 100 includes a plurality of stop plates 124 positioned along each of the plurality of recesses 102. The plurality of stop plates 124 may block movement of the filters within the respective recesses 102 from moving beyond an end 126 of the respective recesses 102 as the filters are slid or otherwise disposed into the respective recesses from an opposing end 128 of the respective recesses 102. Additionally or alternatively, the plurality of stop plates 124 is configured to maintain a position of the filters within the adjustable filter track system 100, such that the filters are disposed within a path of an air flow 117 directed through the adjustable filter track system 100. For instance, the plurality of stop plates 124 extends along a length 119 of the plurality of recesses 102 and provide a barrier to maintain a position of filters within the plurality of filter tracks 104 and the plurality of recesses 102. As shown in the illustrated embodiment of FIG. 5, the plurality of stop plates 124 extend from corresponding guideways 121 of the plurality of filter tracks 104 in a direction transverse to the length 119 of the plurality of recesses 102. As such, the plurality of stop plates 124 is configured to block movement of the filters in a direction 123 within the plurality of filter tracks 104.

Similar to the plurality of filter tracks 104, the plurality of stop plates 124 may include terminal stop plates 125 and intermediate stop plates 127. The intermediate stop plates 127 may be positioned between the first end 120 and the second end 122 of the struts 106, 108 and may be configured to be disposed within multiple recesses 102. In other words, the intermediate stop plates 127 may be spaced between the ends 120, 122 and may be configured to block movement of two filters disposed in adjacent recesses 102 beyond the end 126 of the adjustable filter track system 100. The terminal stop plates 125 are positioned at the ends 120, 122 and may be configured to be disposed within one of the recesses 102, and thus, are configured to block movement a single filter beyond the end 126 of the adjustable filter track system 100.

Figure 6:
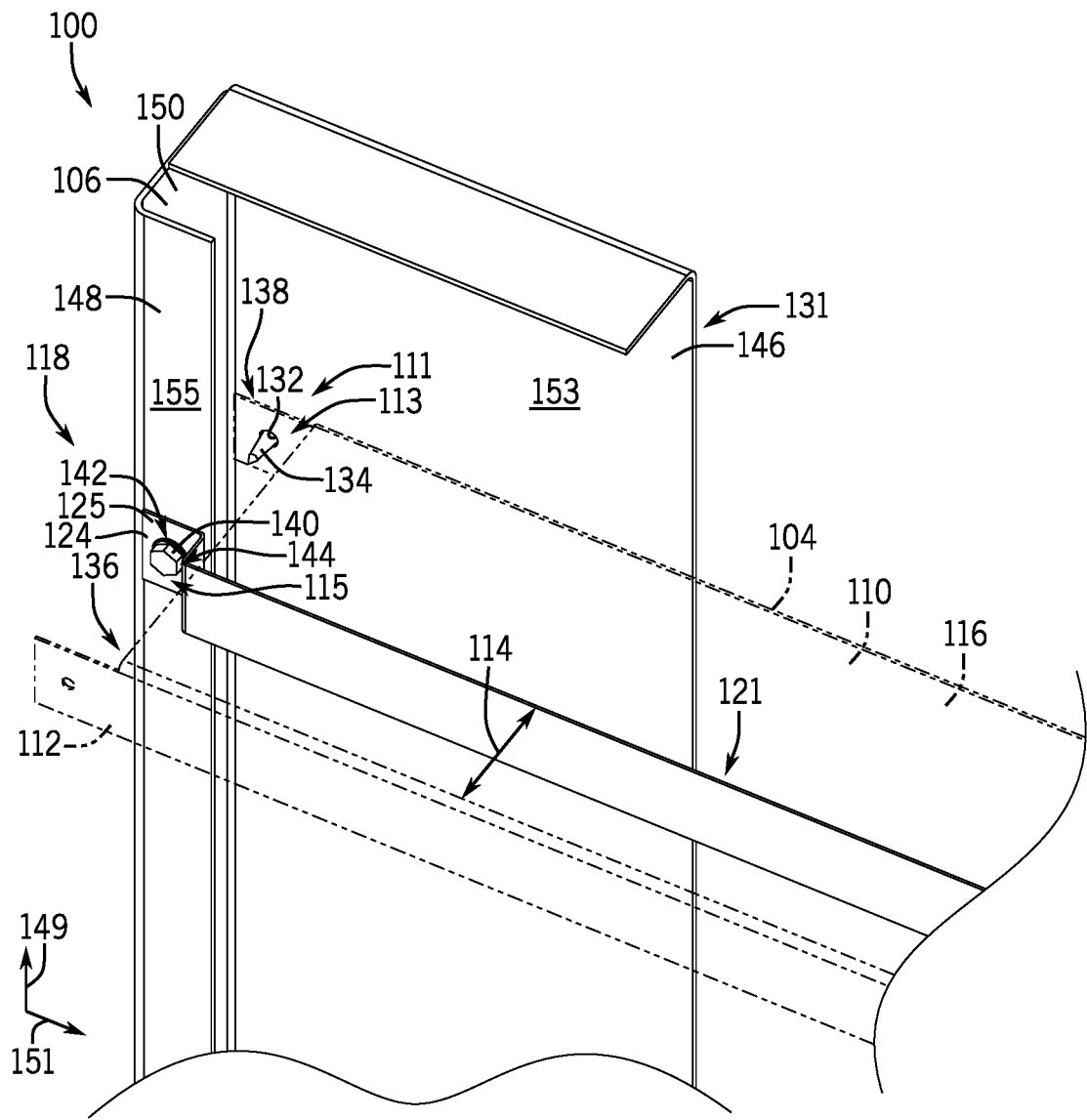
FIG. 6 is an expanded perspective view of an embodiment of a bracket of the first embodiment of the adjustable filter track coupled to a first strut in a first configuration, in accordance with an aspect of the present disclosure.
Figure 7:
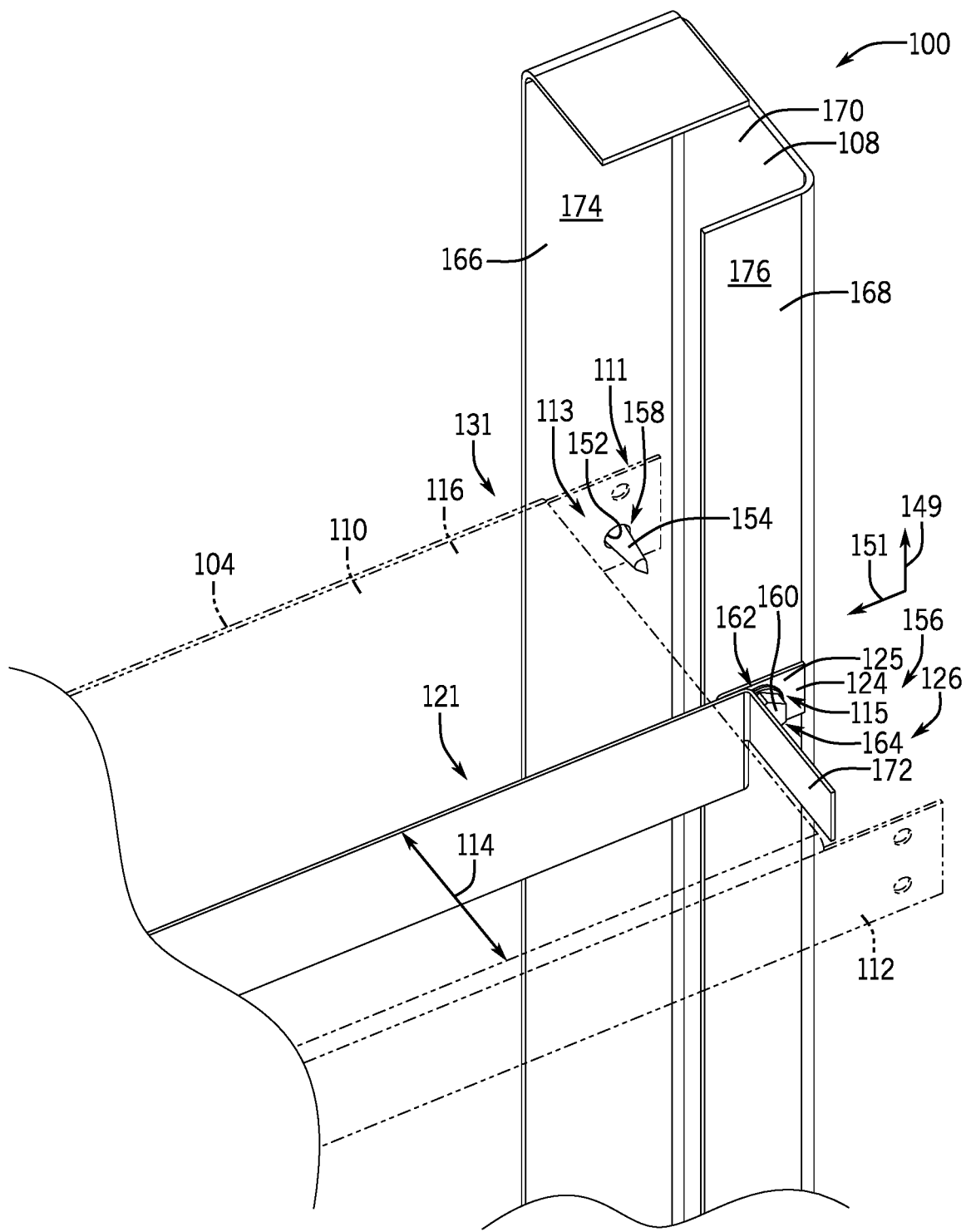
FIG. 7 is an expanded perspective view of an embodiment of the bracket of the first embodiment of the adjustable filter track coupled to a second strut in the first configuration, in accordance with an aspect of the present disclosure.

As set forth above, the adjustable filter track system 100 is configured to receive filters having different sizes or thicknesses. FIGS. 6 and 7 are expanded perspective views of embodiments of the first strut 106 and the second strut 108, respectively, in a first configuration 131. While the illustrated embodiments of FIGS. 6 and 7 illustrate a terminal filter track 116 and a terminal stop plate 125, it should be recognized that the present discussion directed to coupling the terminal filter track 116 and terminal stop plate 125 to the struts 106, 108 may be substantially the same for intermediate filter tracks 118 and intermediate stop plates 127. In any case, in the first configuration 131, the adjustable filter track system 100 is configured to receive a first filter having a first thickness.

As shown in the illustrated embodiment of FIG. 6, the first coupling feature 111 of the first bracket 110 of the plurality of filter tracks 104 includes an opening 132, such as a first opening, configured to receive a fastener 134 that secures a first end 136 of the filter track 104 to the first strut 106 in the first configuration 131. The second coupling feature 113 of the first strut 106 includes a corresponding opening 138 that is configured to align with the opening 132, such that the fastener 134 extends through the opening 132 and the corresponding opening 138 in the first configuration 131. In some embodiments, the fastener 134 includes a rivet, a screw and a nut, a bolt and a nut, and/or another suitable fastener configured to secure the filter track 104 to the first strut 106.

Further, the adjustable filter track system 100 includes a respective stop plate 124 secured to the first strut 106 at the first end 136 of the respective recess 102. As shown in the illustrated embodiment of FIG. 6, the respective stop plate 124 is configured to be secured to the first strut 106 via a fastener 140 extending through an opening 142 of the respective stop plate 124 and a corresponding opening 144 in the first strut 106. The corresponding opening 144 may be part of the third coupling feature 115 of the first strut 106 and/or a separate opening for securing the stop plate 124 to the first strut 106. In some embodiments, the first strut 106 includes a first panel 146 that includes the second coupling feature 113 and a second panel 148, opposite the first panel 146, that includes the third coupling feature 115 and/or the corresponding opening 144. Further, the first strut 106 may include a third panel 150 coupled to, or extending between, the first panel 146 and the second panel 148. The first strut 106 may thus define an open-sided structure having a C-shaped cross section formed by the first panel 146, the second panel 148, and the third panel 150. In other embodiments, the first strut 106 may include another suitable cross section or geometry that enables the plurality of filter tracks 104 to be coupled to the first strut 106 in the first configuration 131 and a second configuration. In any case, the first strut 106 extends in a direction 149 that is transverse to a direction 151 along which the length 119 of the plurality of recesses 102 extends. Further, as shown in FIG. 6, the plurality of recesses 102 of the adjustable filter track system 100 extends from an interior face 153 of the first panel 146 of the first strut 106 past an exterior face 155 of the second panel 148 of the first strut 106. The filters are configured to be secured between the exterior face 155 of the second panel 148 of the first strut 106 and the second bracket 112 of the plurality of filter tracks 104. The filters are also secured between the stop plate 124 and the second bracket 112.

As shown in the illustrated embodiment of FIG. 7, the filter track 104 is coupled to the second strut 108 at the end 126 of the recess 102 in the first configuration 131. The first bracket 110 of the plurality of filter tracks 104 includes an opening 152, such as a second opening, configured to receive a fastener 154 that secures a second end 156 of the filter track 104 to the second strut 108 in the first configuration 131. The second coupling feature 113 of the second strut 108 includes a corresponding opening 158 that is configured to align with the opening 152, such that the fastener 154 extends through the opening 152 and the corresponding opening 158 in the first configuration 131. In some embodiments, the fastener 154 includes a rivet, a screw and a nut, a bolt and a nut, and/or another suitable fastener configured to secure the filter track 104 to the second strut 108.

Further, the adjustable filter track system 100 includes the stop plate 124 secured to the second strut 108 at the end 126 of the respective recess 102. As shown in the illustrated embodiment of FIG. 7, the stop plate 124 is configured to be secured to the second strut 108 via a fastener 160 extending through an opening 162 of the stop plate 124 and a corresponding opening 164 extending through the second strut 108. The corresponding opening 164 may be part of the third coupling feature 115 of the second strut 108 and/or a separate opening for securing the stop plate 124 to the second strut 108. In some embodiments, the second strut 108 includes a first panel 166 that includes the second coupling feature 113 and a second panel 168 that includes the third coupling feature 115 and/or corresponding opening 164. The second strut 108 may also include a third panel 170 coupled to, or extending between, the first panel 166 and the second panel 168. The second strut 108 may thus have a C-shaped cross section formed by the first panel 166, the second panel 168, and the third panel 170. In other embodiments, the second strut 108 may include another suitable cross section or geometry that enables the plurality of filter tracks 104 to be coupled to the second strut 108 in the first configuration 131 and a second configuration. In any case, the second strut 108 extends in the direction 149 that is transverse to the direction 151 along which the length 119 of the plurality of recesses 102 extends.

The stop plate 124 shown in FIG. 7, which is one of the terminal stop plates 125, includes a flange 172 at the end 126 of the adjustable filter track system 100. The flange 172 may block movement of a filter in the direction 151 along the length 119 of the respective recess 102 formed by the respective filter track 104, the first strut 106, and the second strut 108. As such, the filter may be secured within the adjustable filter track system 100 in a position that removes particulates and/or contaminants from the air flow directed through and across the adjustable filter track system 100. Further, as shown in FIG. 7, the plurality of recesses 102 of the adjustable filter track system 100 extends from an interior face 174 of the first panel 166 of the second strut 108 past an exterior face 176 of the second panel 168 of the second strut 108. The filters are configured to be secured between the exterior face 176 of the second panel 168 of the second strut 108 and the second bracket 112 of the plurality of filter tracks 104. The filters are also secured between the stop plate 124 and the second bracket 112.

Figure 8:
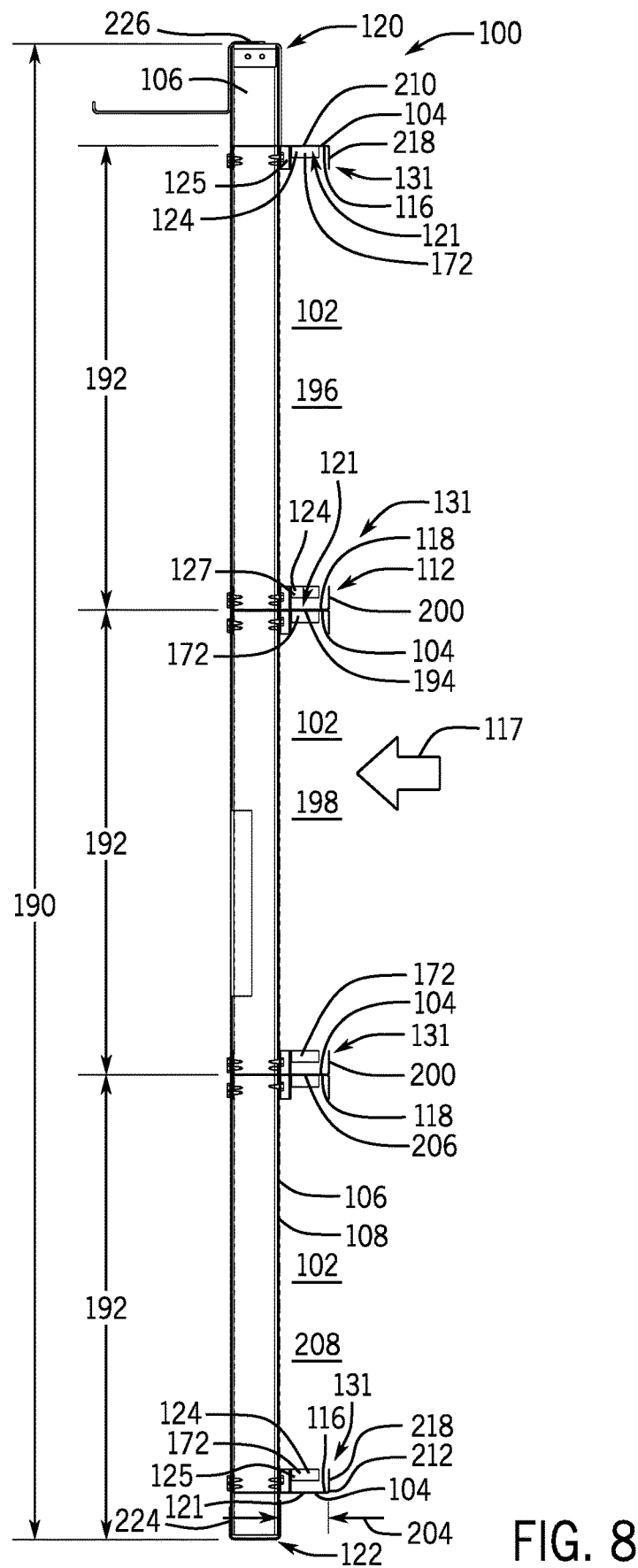
FIG. 8 is a side view of the first embodiment of the adjustable filter track having a plurality of brackets coupled to the first strut and the second strut in the first configuration, in accordance with an aspect of the present disclosure.

As set forth above, the adjustable filter track system 100 includes the plurality of filter tracks 104 that are each disposed along a height 190 of the first strut 106 and the second strut 108 extending from the first end 120 to the second end 122. For example, FIG. 8 is a side view of an embodiment of the adjustable filter track system 100 having the plurality of filter tracks 104 secured to the first strut 106 and the second strut 108 in the first configuration 131. As shown in the illustrated embodiment of FIG. 8, the plurality of filter tracks 104 is spaced with a respective distance 192 between one another along the height 190 of the first strut 106 and the second strut 108. In some embodiments, the distance 192 may be a predetermined height that is configured to accommodate a height of filters disposed within the plurality of recesses 102 of the adjustable filter track system 100. The distance 192 may be uniform between the plurality of filter tracks 104, and, in other embodiments, the distance 192 may be non-uniform.

As set forth above, the intermediate filter tracks 118 may be configured to partially form more than one of the plurality of recesses 102. For example, a first intermediate filter track 194 of the plurality of filter tracks 104 may be configured to partially form a first recess 196 of the plurality of recesses 102 and a second recess 198 of the plurality of recesses 102. As such, the second bracket 112 of the first intermediate filter track 194 may include a flange 200 extending above and below the guideway 121 of the first intermediate filter track 194. The guideway 121 of the first intermediate filter track 194 may be utilized as a support and/or guide for the filters disposed within the first recess 196 and the second recess 198 of the plurality of recesses 102. Additionally, the flange 200 may be utilized to facilitate installation of the filters into the first recess 196 and the second recess 198. For instance, the flange 200 may be offset from the first strut 106 and/or the second strut 108 by a distance 204 that corresponds to a thickness or size of one embodiment of the filters. As such, the filters may be configured to be disposed between the first strut 106, the second strut 108, and the flange 200 and may be slid into the first recess 196 and the second recess 198 up to the flange 172 of the respective stop plate 124, such as an intermediate stop plate 127. The respective stop plate 124 blocks movement of the filters in the first recess 196 and the second recess 198 beyond the second strut 108 in a direction of the air flow 117 across the adjustable filter track system 100 to maintain a position of the filters within the adjustable filter track system 100.

Additionally, the flange 172 of the respective stop plate 124 coupled to the first strut 106 and the second strut 108 at the same position as the first intermediate filter track 194 with respect to the height 190 of the struts 106, 108 may extend aside or into the first recess 196 and the second recess 198. As such, the flange 172 of the respective stop plate 124 may be utilized to block movement of filters disposed in both the first recess 196 and the second recess 198. As shown in the illustrated embodiment of FIG. 8, the adjustable filter track system 100 may also include a second intermediate filter track 206 that includes the flange 200, and thus, partially forms the second recess 198 and a third recess 208. While the illustrated embodiment of FIG. 8 shows the adjustable filter track system 100 having the first intermediate filter track 194 and the second intermediate filter track 206 that are configured to partially form multiple recesses of the plurality of recesses 102, it should be understood that the adjustable filter track system 100 may include any suitable number of intermediate filter tracks 118 having the flange 200 extending aside or into multiple recesses of the plurality of recesses 102.

Further, the adjustable filter track system 100 includes the terminal filter tracks 116 positioned at each of the ends 120, 122 of the first strut 106 and the second strut 108. For instance, the adjustable filter track system 100 includes a first terminal filter track 210 and a second terminal filter track 212 of the plurality of filter tracks 104. The first terminal filter track 210 may be disposed at the first end 120 of the first strut 106 and the second strut 108, and the second terminal filter track 212 may be disposed at the second end 122 of the first strut 106 and the second strut 108. The first terminal filter track 210 and the second terminal filter track 212 are configured to partially form the first recess 196 and the third recess 208, respectively. In other words, the first terminal filter track 210 and the second terminal filter track 212 are configured to partially form terminal recesses of the plurality of recesses 102 that are proximate to the first end 120 and the second end 122 of the first strut 106 and the second strut 108.

In any case, the first terminal filter track 210 and the second terminal filter track 212 may each include a flange 218 that extends from the respective guideway 121 in a single direction with respect to the height 190 of the first strut 106 and the second strut 108. The flange 218 is configured to facilitate installation of the filters into the first recess 196 and the third recess 208 of the illustrated embodiment. For instance, the flange 218 may be offset from the first strut 106 and/or the second strut 108 at the distance 204 that corresponds to a thickness or size of the filters. As such, the filters may be configured to be disposed between the first strut 106, the second strut 108, and/or the flange 218 and slid into the first recess 196 and the third recess 208 up to the flange 172 of the respective stop plate 124, such as the respective terminal stop plate 125 of the terminal filter track 210, 212. Additionally, the flange 172 of the respective stop plates 124 disposed at the same position as the first terminal filter track 210 and the second terminal filter track 212 with respect to the height 190 of the struts 106, 108 may extend into or aside only the first recess 196 or the third recess 208. In other words, because the respective stop plates 124 are positioned at the terminal ends 120, 122 of the struts 106, 108, the respective stop plates 124 maintain a position of a filter positioned in a single one of the recesses 102.

In some embodiments, the adjustable filter track system 100 includes a base support member 224 and a top support member 226. As shown in the illustrated embodiment of FIG. 8, the base support member 224 is disposed on the second end 122 of the first strut 106 and the second strut 108 to provide support to the second terminal filter track 212. Additionally, the top support member 226 is disposed on the first end 120 of the first strut 106 and the second strut 108 to provide support to the first terminal filter track 210. The base support member 224 and the top support member 226 are discussed in further detail herein with reference to FIGS. 10 and 11.

Figure 9:
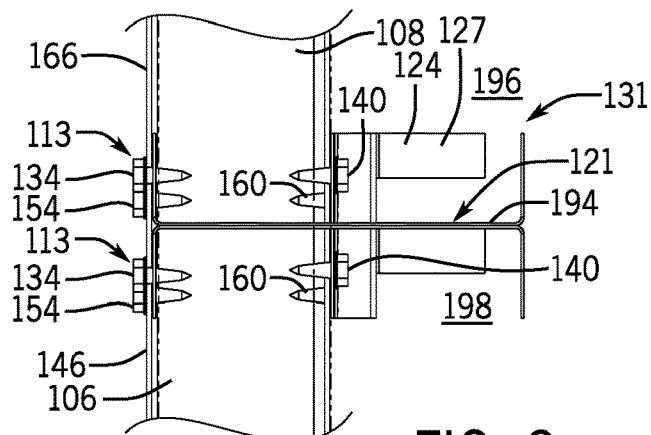
FIG. 9 is a cross-sectional side view of an embodiment of an intermediate bracket of the first embodiment of the adjustable filter track coupled to the first strut and the second strut in the first configuration, in accordance with an aspect of the present disclosure.

FIG. 9 is an expanded cross-sectional side view of an embodiment of the first intermediate filter track 194 coupled to the first strut 106 and the second strut 108 in the first configuration 131. As should be understood, the second intermediate filter track 206 may be similarly coupled to the first strut 106 and the second strut 108 and may have similar elements as those shown in FIG. 9. In any case, the first intermediate filter track 194 may be coupled to the first strut 106 at the end 128 of the adjustable filter track system 100 via the second coupling feature 113 of the first strut 106 and the fastener 134 extending through the first panel 146 of the first strut 106. Similarly, the first intermediate filter track 194 may be coupled to the second strut 108 at the end 126 of the adjustable filter track system 100 via the second coupling feature 113 of the second strut 108 and the fastener 154 extending through the first panel 166 of the second strut 108. Further, the respective stop plate 124, such as one of the intermediate stop plates 127, is coupled to both the first strut 106 and the second strut 108 via the fastener 140 and the fastener 160, respectively.

In some embodiments, the intermediate filter tracks 118 may be formed with two adjacent terminal filter tracks 116 coupled to one another and/or otherwise abutting one another when coupled to the struts 106, 108. As such, the intermediate filter tracks 118 may include two separate terminal filter tracks 116 and/or a single piece component. As shown in the illustrated embodiment of FIG. 9, the first intermediate filter track 194 and the respective stop plate 124 associated with the first intermediate filter track 194 are coupled to the first strut 106 and the second strut 108 above and below the guideway 121 with respect to the height 190 of the struts 106, 108. As such, the adjustable filter track system 100 includes two of the fasteners 134, two of the fasteners 140, two of the fasteners 154, and two of the fasteners 160. The additional fasteners utilized for the intermediate filter tracks 118 may provide additional support to the intermediate filter tracks 118. As set forth above, the intermediate filter tracks 118 may be utilized to partially form multiple recesses of the plurality of recesses 102. As such, the additional support provided by the additional fasteners may enable the intermediate filter tracks 118 to guide and secure multiple filters within the multiple recesses 102.

Figure 10:
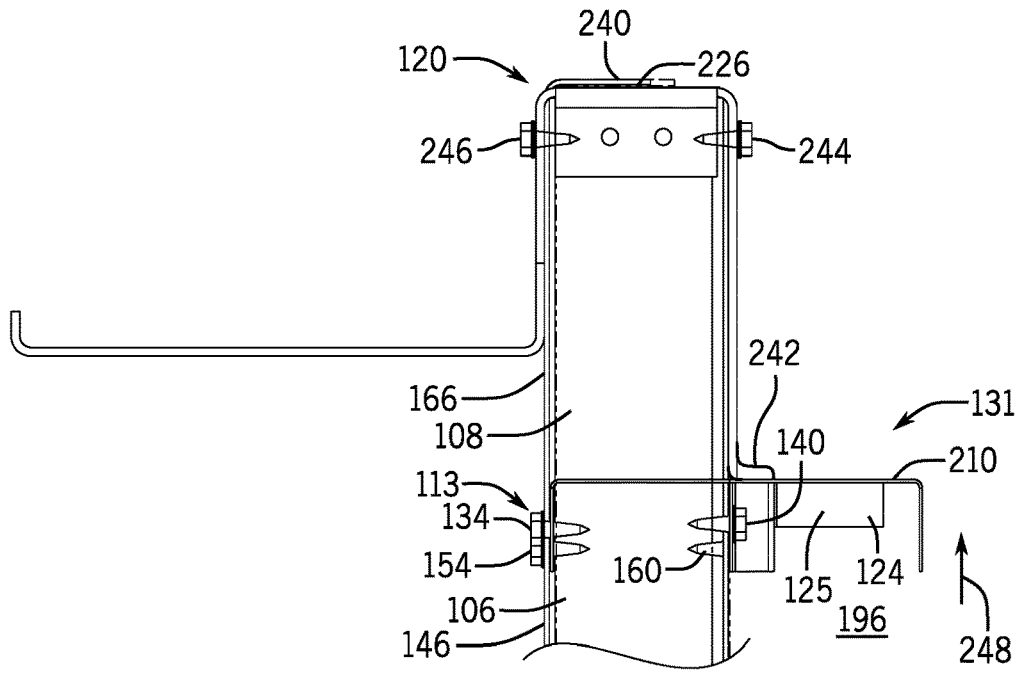
FIG. 10 is a cross-sectional side view of an embodiment of a first terminal bracket of the first embodiment of the adjustable filter track coupled to the first strut and the second strut in the first configuration, in accordance with an aspect of the present disclosure.

FIG. 10 is an expanded cross-sectional side view of the first terminal filter track 210 coupled to the first strut 106 and the second strut 108 in the first configuration 131. As shown in the illustrated embodiment, the first terminal filter track 210 is coupled to the first strut 106 at the end 128 of the first recess 196 via the second coupling feature 113 of the first strut 106 and the fastener 134 extending through the first panel 146 of the first strut 106. Similarly, the first terminal filter track 210 is coupled to the second strut 108 at the end 126 of the first recess 196 via the second coupling feature 113 of the second strut 108 and the fastener 154 extending through the first panel 166 of the second strut 108. Further, the respective stop plate 124, such as the terminal stop plate 125, is coupled to both the first strut 106 and the second strut 108 via the fastener 140 and the fastener 160, respectively.

As shown in the illustrated embodiment of FIG. 10, the top support member 226 is coupled to the first end 120 of the struts 106, 108. In some embodiments, the top support member 226 includes a coupling portion 240 and a support flange 242. The coupling portion 240 of the top support member 226 is coupled to the first end 120 of the first strut 106 via a fastener 244 and to the first end 120 of the second strut 108 via a fastener 246. Further, the support flange 242 of the top support member 226 may contact and/or abut the first terminal filter track 210. Accordingly, the support flange 242 may block movement of the first terminal filter track 210 with respect to a direction 248 along the height 190 of the struts 106, 108. Thus, the first terminal filter track 210 may facilitate insertion of the filters into the first recess 196 because the support flange 242 restricts an amount of movement of the first terminal filter track 210 with respect to the struts 106, 108. In other words, the filter may not inadvertently move out of the first recess 196 due to movement of the first terminal filter track 210 as the filter is slid into the first recess 196.

Figure 11:
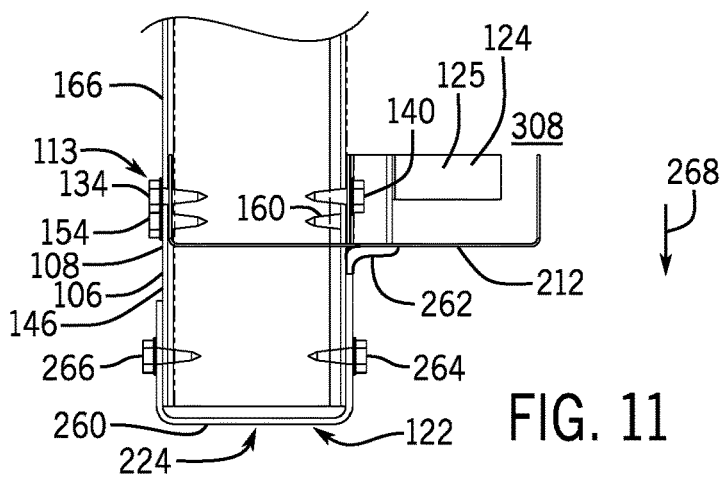
FIG. 11 is a cross-sectional side view of an embodiment of a second terminal bracket of the first embodiment of the adjustable filter track coupled to the first strut and the second strut in the first configuration, in accordance with an aspect of the present disclosure.

FIG. 11 is an expanded side view of the second terminal filter track 212 coupled to the first strut 106 and the second strut 108 in the first configuration 131. As shown in the illustrated embodiment, the second terminal filter track 212 is coupled to the first strut 106 at the end 128 of the third recess 208 via the second coupling feature 113 of the first strut 106 and the fastener 134 extending through the first panel 146 of the first strut 106. Similarly, the second terminal filter track 212 is coupled to the second strut 108 at the end 126 of the third recess 208 via the second coupling feature 113 of the second strut 108 and the fastener 154 extending through the first panel 166 of the second strut 108. Further, the respective stop plate 124, such as the terminal stop plate 125, is coupled to both the first strut 106 and the second strut 108 via the fastener 140 and the fastener 160, respectively.

As shown in the illustrated embodiment of FIG. 11, the base support member 224 is coupled to the second end 122 of the struts 106, 108. In some embodiments, the base support member 224 includes a coupling portion 260 and a support flange 262. The coupling portion 260 of the base support member 224 is coupled to the second end 122 of the first strut 106 via a fastener 264 and to the second end 122 of the second strut 108 via a fastener 266. Further, the support flange 262 of the base support member 224 may contact and/or abut the second terminal filter track 212. Accordingly, the support flange 262 may block movement of the first terminal filter track 210 with respect to a direction 268, opposite the direction 248, along the height 190 of the struts 106, 108. Thus, the second terminal filter track 212 may facilitate insertion of the filters into the third recess 208 because the support flange 262 restricts an amount of movement of the second terminal filter track 212 with respect to the struts 106, 108. In other words, the filter may not inadvertently move out of the third recess 208 due to movement of the second terminal filter track 212 as the filter is slid into the third recess 208.

As set forth above, the adjustable filter track system 100 is configured to receive and secure filters having various thicknesses. FIGS. 12-17 illustrate embodiments of the adjustable filter track system 100 of FIGS. 5-11 in a second configuration 280. As shown in the illustrated embodiments of FIGS. 12-17, the plurality of filter tracks 104 may be coupled to the second panel 148 of the first strut 106 and the second panel 168 of the second strut 108 via the third coupling feature 115 of the struts 106, 108. For example, the third coupling feature 115 of the first strut 106 includes an opening 282, such as a third opening, extending through the second panel 148 to enable the first bracket 110 of the plurality of filter tracks 104 to couple to the first strut 106 in the second configuration 280. Similarly, the third coupling feature 115 of the second strut 108 includes an opening 284, such as a fourth opening, extending through the second panel 168 of the second strut 108 to enable the first bracket 110 of the plurality of filter tracks 104 to couple to the second strut 108 in the second configuration 280.

Figure 12:
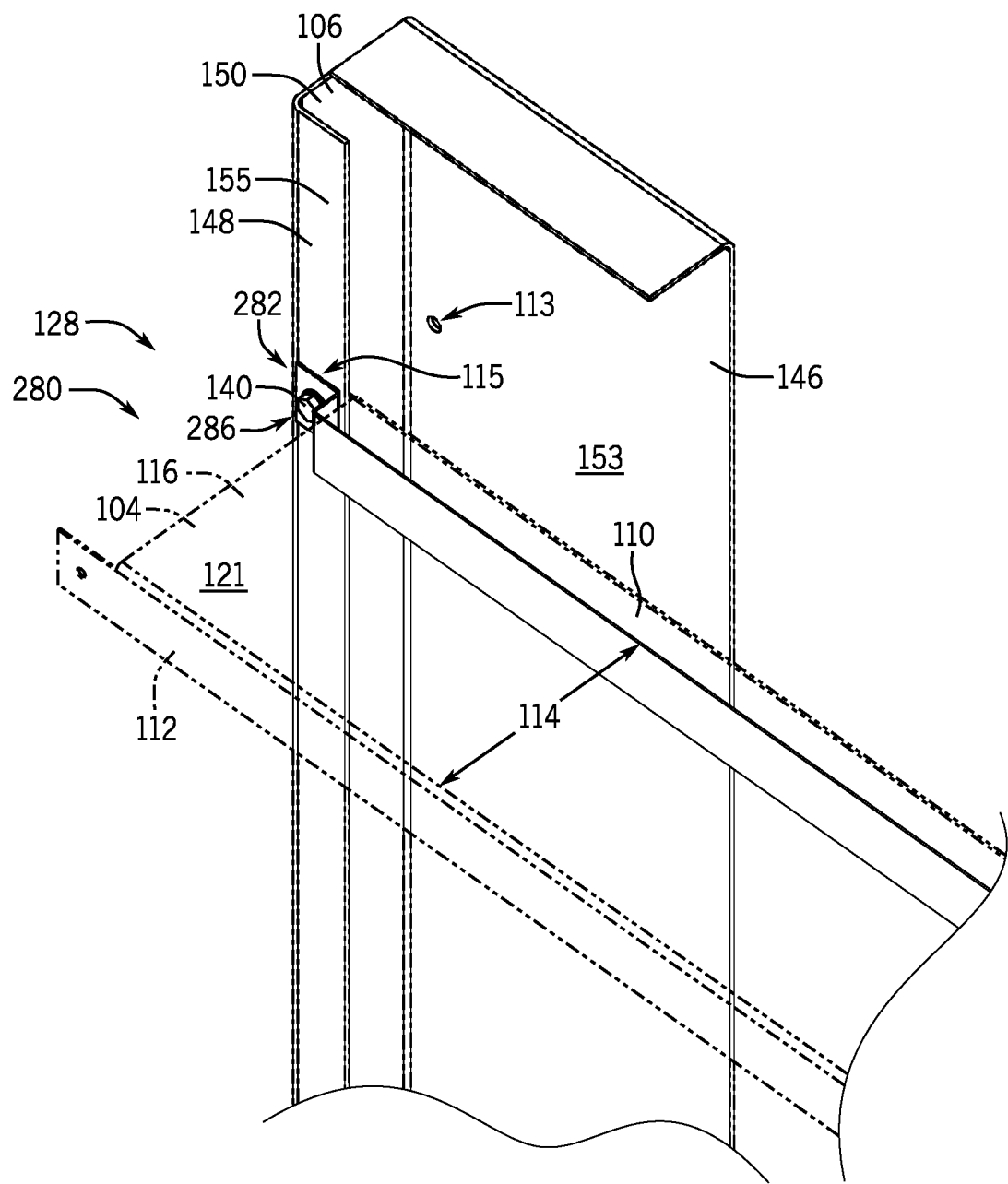
FIG. 12 is an expanded perspective view of an embodiment of the bracket of the first embodiment of the adjustable filter track coupled to the first strut in a second configuration, in accordance with an aspect of the present disclosure.
Figure 13:
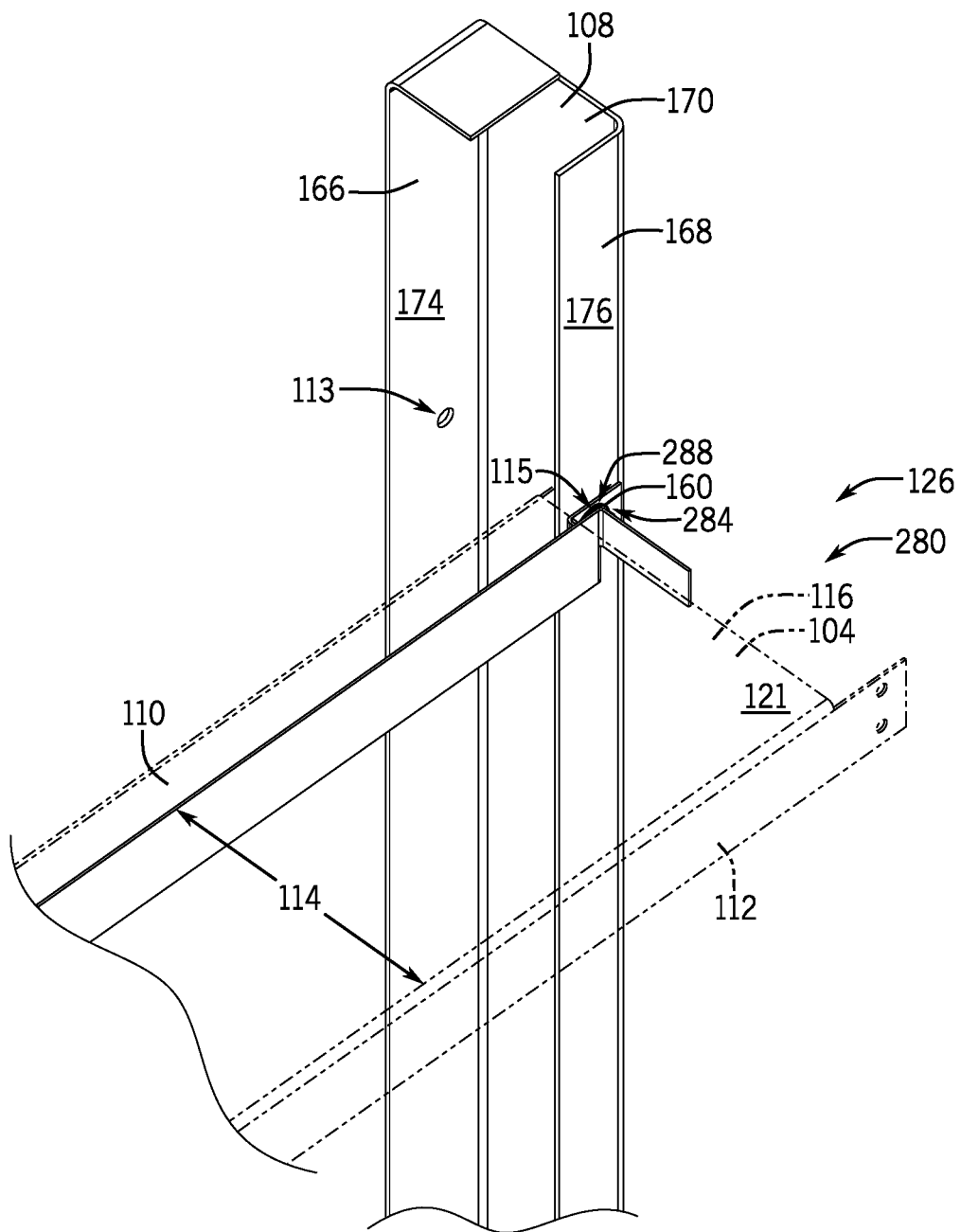
FIG. 13 is an expanded perspective view of an embodiment of the bracket of the first embodiment of the adjustable filter track coupled to the second strut in the second configuration, in accordance with an aspect of the present disclosure.
Figure 14:
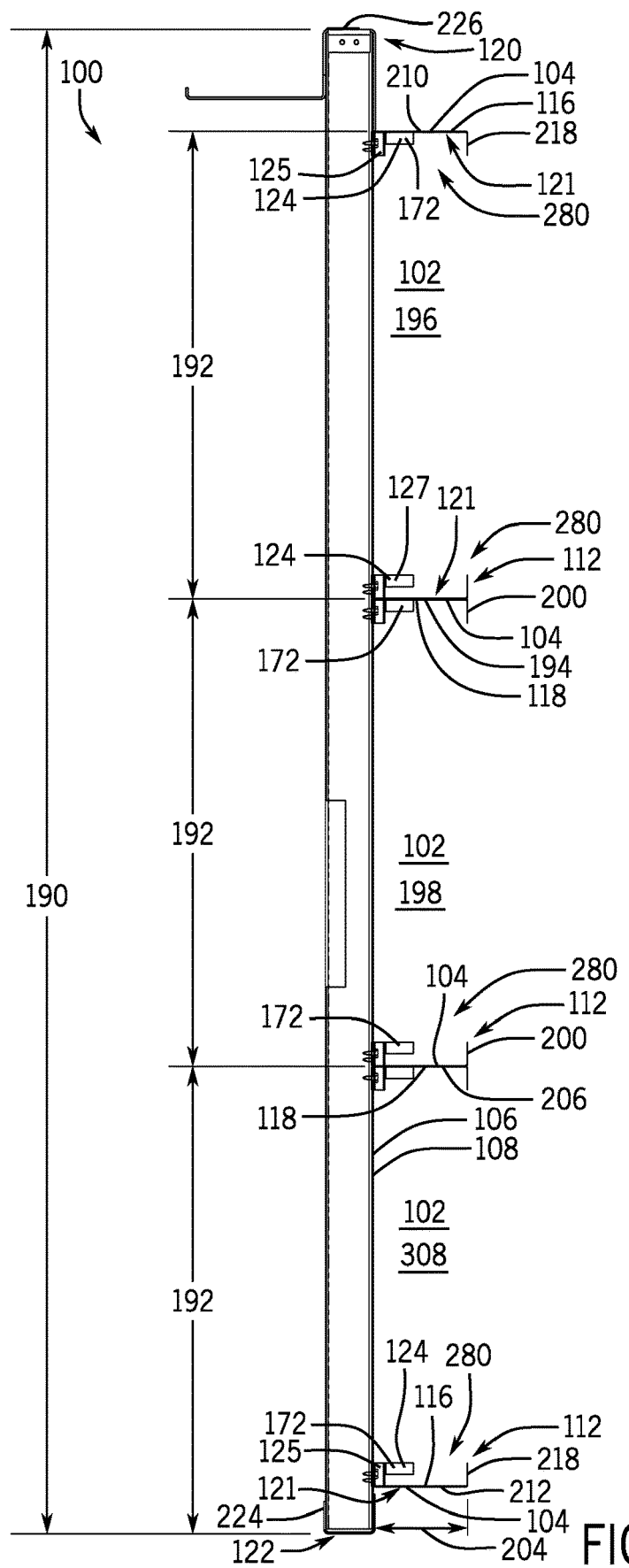
FIG. 14 is a side view of the first embodiment of the adjustable filter track having the plurality of brackets coupled to the first strut and the second strut in the second configuration, in accordance with an aspect of the present disclosure.
Figure 15:
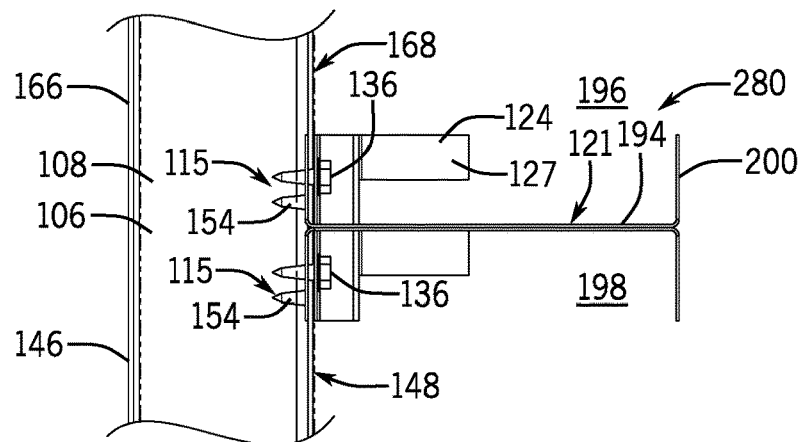
FIG. 15 is a cross-sectional side view of an embodiment of the intermediate bracket of the first embodiment of the adjustable filter track coupled to the first strut and the second strut in the second configuration, in accordance with an aspect of the present disclosure.
Figure 16:
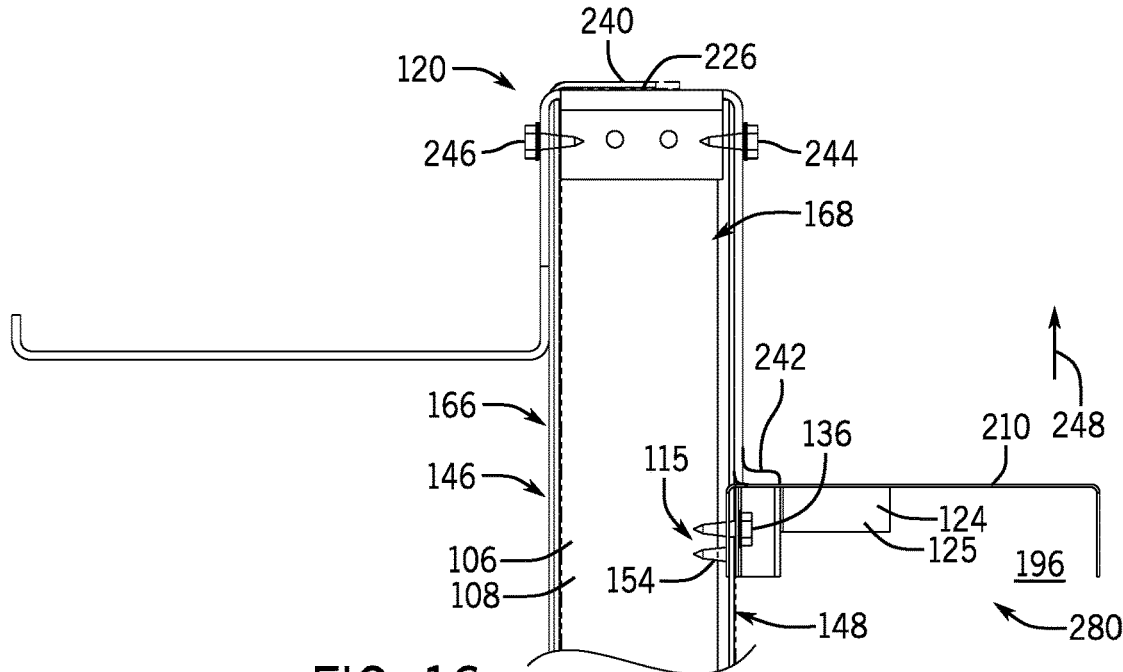
FIG. 16 is a cross-sectional side view of an embodiment of the first terminal bracket of the first embodiment of the adjustable filter track coupled to the first strut and the second strut in the second configuration, in accordance with an aspect of the present disclosure.
Figure 17:
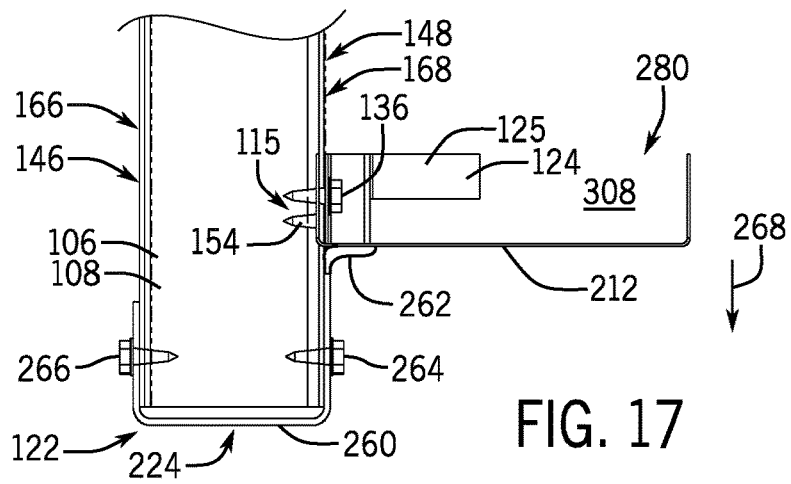
FIG. 17 is a cross-sectional side view of an embodiment of the second terminal bracket of the first embodiment of the adjustable filter track coupled to the first strut and the second strut in the second configuration, in accordance with an aspect of the present disclosure.

As shown in the illustrated embodiments of FIG. 12, the first bracket 110 of the plurality of filter tracks 104 includes a corresponding opening 286 configured to align with the opening 282 of the first strut 106. Accordingly, the fastener 140, or another fastener, may extend through the opening 282 and the corresponding opening 286 to couple the first bracket 110 to the first strut 106. Additionally, as shown in FIG. 13, the first bracket 110 of the plurality of filter tracks 104 may include a corresponding opening 288 configured to align with the opening 284 of the second strut 108. As such, the fastener 160, or another fastener, may extend through the opening 284 and the corresponding opening 288 to couple the first bracket 110 to the second strut 108. In the second configuration 280, the plurality of filter tracks 104 extends the depth 114 outwardly from the first strut 106 and the second strut 108. Specifically, the plurality of recesses 102 extends from the exterior faces 155, 176 of the struts 106, 108 to the second bracket 112 of the plurality of filter tracks 104. As such, a first magnitude of the depth 114 of the plurality of recesses 102 in the second configuration 280 is greater than a second magnitude of the depth 114 of the plurality of recesses 102 in the first configuration 131. Therefore, the adjustable filter track system 100 is configured to receive and secure filters having a greater size of thickness in the second configuration 280 as compared to the first configuration 131.

FIGS. 14-17 illustrate side views of the adjustable filter track system 100 with the plurality of filter tracks 104 coupled to the first strut 106 and the second strut 108 in the second configuration 280. Accordingly, FIGS. 14-17 include similar elements and element numbers as those described above with reference to FIGS. 12 and 13. It should be noted that, in some embodiments, transitioning between the first configuration 131 and the second configuration 280 may not involve coupling and/or uncoupling the plurality of stop plates 124, the base support member 224, and/or the top support member 226. In any case, the plurality of stop plates 124, the base support member 224, and/or the top support member 226 may remain in substantially the same position with respect to the first strut 106 and the second strut 108 in both the first configuration 131 and the second configuration 280.

Second Embodiment of the Adjustable Filter Track

Figure 18:
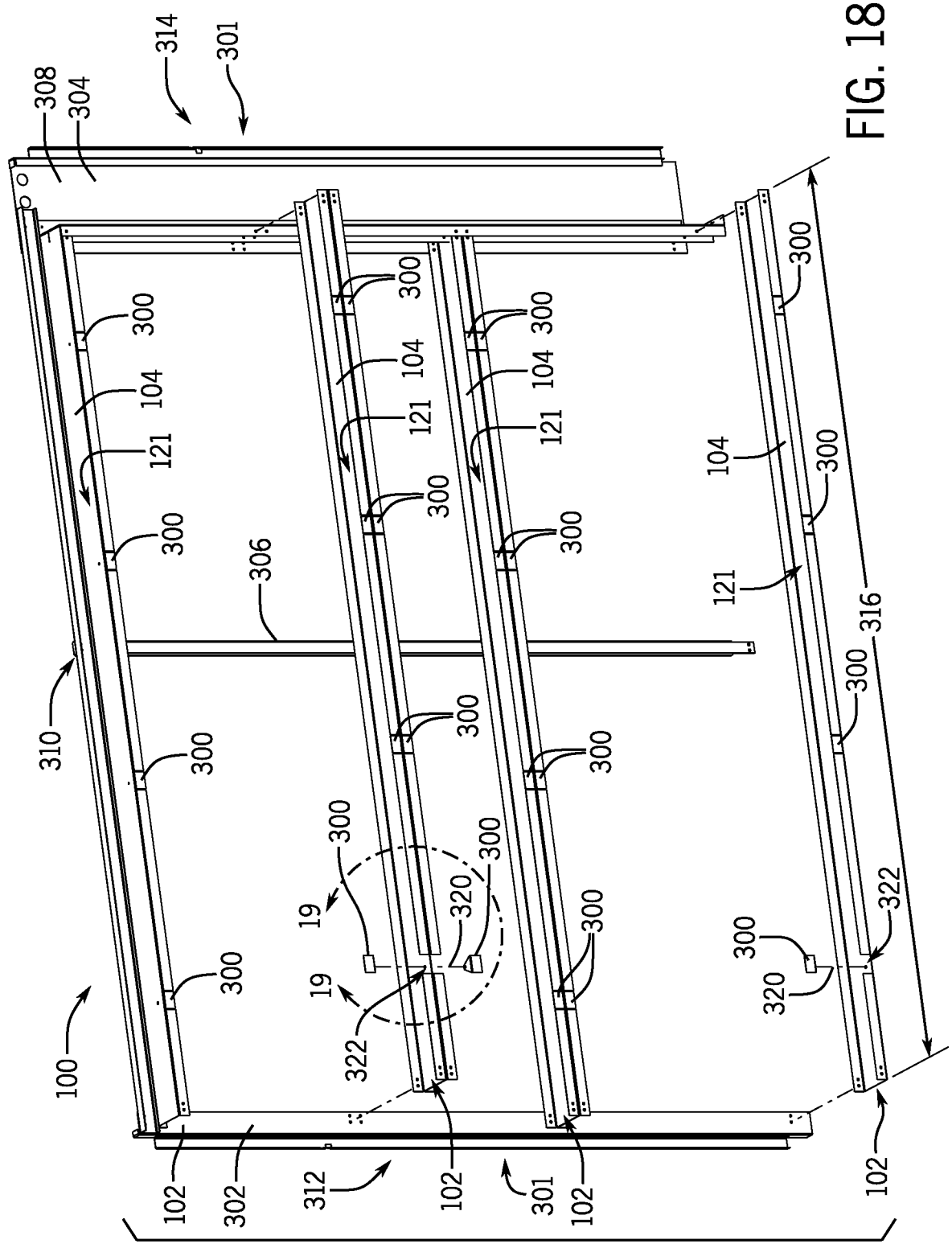
FIG. 18 is an exploded perspective view of a second embodiment of the adjustable filter track having a plurality of adjustable angle brackets, in accordance with an aspect of the present disclosure.

FIG. 18 is an exploded perspective view of an embodiment of the adjustable filter track system 100 having a plurality of adjustable angle brackets 300 configured to rotatably couple to the plurality of filter tracks 104. As shown in the illustrated embodiment of FIG. 18, the plurality of filter tracks 104 is configured to couple to a frame 301 having a first strut 302, a second strut 304, and/or a support beam 306 of the adjustable filter track system 100. In some embodiments, the first strut 302 and the second strut 304 may include substantially the same configuration as the first strut 106 and the second strut 108 discussed above. In other embodiments, the first strut 302 and the second strut 304 may include portions of a housing 308 of an HVAC system, such as HVAC unit 12. The support beam 306 may be utilized to provide support to the plurality of filter tracks 104 at a position 310 between a first end 312 and a second end 314 of the plurality of recesses 102. In some embodiments, the support beam 306 is not included in the adjustable filter track system 100, and the plurality of filter tracks 104 are supported by the first strut 302 and the second strut 304.

The plurality of adjustable angle brackets 300 are positioned along a length 316 of the plurality of recesses 102 and/or the plurality of filter tracks 104 between the first end 312 and the second end 314. In some embodiments, the plurality of adjustable angle brackets 300 is equally spaced along the length 316 of the plurality of recesses 102 and/or the plurality of filter tracks 104. In other embodiments, the plurality of adjustable angle brackets 300 is spaced non-uniformly along the length 316 of the plurality of recesses 102 and/or the plurality of filter tracks 104. In any case, the plurality of adjustable angle brackets 300 is configured to transition between a first configuration and a second configuration to enable the adjustable filter track system 100 to receive and secure filters having various sizes and/or thicknesses. For instance, the plurality of adjustable angle brackets 300 is coupled to a respective guideway 121 of each of the filter tracks 104. The plurality of adjustable angle brackets 300 is configured to rotate about an axis 320 defined by an opening 322 extending through the guideway 121 at a position at which each of the plurality of adjustable angle brackets 300 is coupled to the guideway 121. In some embodiments, the plurality of adjustable angle brackets 300 may be rotated about the axis 320 approximately 180 degrees to transition between the first configuration and the second configuration.

Figure 19:
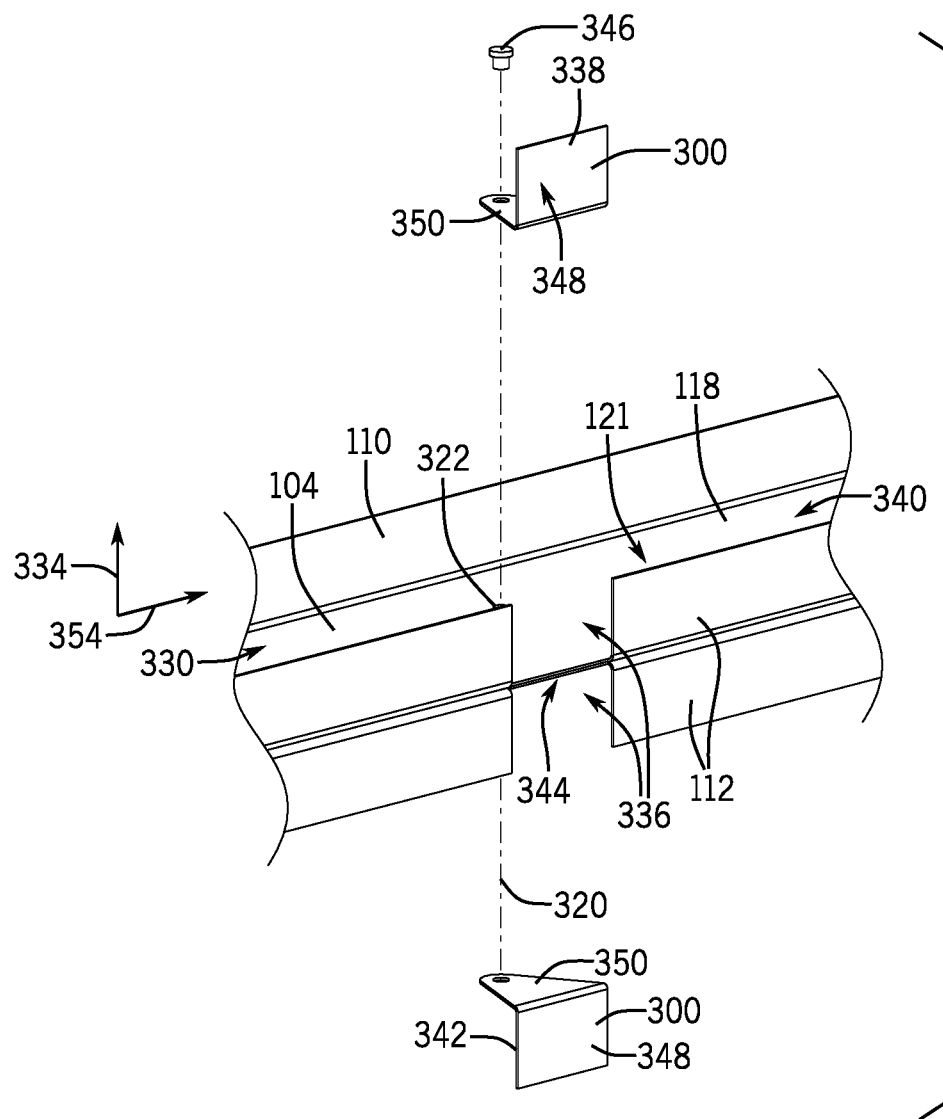
FIG. 19 is an expanded perspective view of an embodiment of the adjustable angle brackets of the second embodiment of the adjustable filter track, in accordance with an aspect of the present disclosure.

FIG. 19 is a partial exploded perspective view of an embodiment of the adjustable angle brackets 300 and the plurality of filter tracks 104. As shown in the illustrated embodiment of FIG. 19, each of the plurality of filter tracks 104, which ultimately form the plurality of recesses 102, includes the first bracket 110, the second bracket 112, and the guideway 121. The first bracket 110, the second bracket 112, and the guideway 121 may form a groove 330 of the plurality of recesses 102, which is configured to slidably receive a filter. Additionally, the first bracket 110 and the second bracket 112 extend in a direction 334 transverse to the guideway 121, and thus, transverse to a direction of air flow through the plurality of recesses 102. In some embodiments, the first bracket 110 may include a plurality of openings 336 or cutouts along the length 316 of the plurality of recesses 102 and/or the plurality of filter tracks 104. The positions of the plurality of openings 336 of the first bracket 110 may align with corresponding positions of the plurality of adjustable angle brackets 300 along the length 316 of the plurality of recesses 102 and/or the plurality of filter tracks 104. As such, the plurality of openings 336 may enable the plurality of adjustable angle brackets 300 to align with the second bracket 112 when in the second configuration.

Further, as shown in FIG. 19, a first adjustable angle bracket 338 may be coupled to a first side 340 of the guideway 121, and a second adjustable angle bracket 342 may be coupled to a second side 344 of the guideway 121 when the filter track 104 is an intermediate filter track 118. In some embodiments, the first adjustable angle bracket 338 and the second adjustable angle bracket 342 may be coupled to the guideway 121 using a fastener 346, such as a rivet, a button rivet, a screw and a bolt, a nut and a bolt, or another suitable fastener. The fastener 346 may couple both the first adjustable angle bracket 338 and the second adjustable angle bracket 342 to the guideway 121 and may enable rotation of the first adjustable angle bracket 338 and the second adjustable angle bracket 342 about the axis 320. In other embodiments, multiple fasteners 346 may be utilized to couple the first adjustable angle bracket 338 and the second adjustable angle bracket 342 to the guideway 121.

As shown in the illustrated embodiment of FIG. 19, the plurality of adjustable angle brackets 300 may each include a first panel 348 and a second panel 350. The first panel 348 extends in the direction 334 transverse to a direction 354 along which the plurality of filter tracks 104 extends. Further, the second panel 350 is coupled to the guideway 121 via the fastener 346. The first adjustable angle bracket 338 and the second adjustable angle bracket 342 are configured to rotate within the groove 330 to transition between the first configuration and the second configuration.

Figure 20:
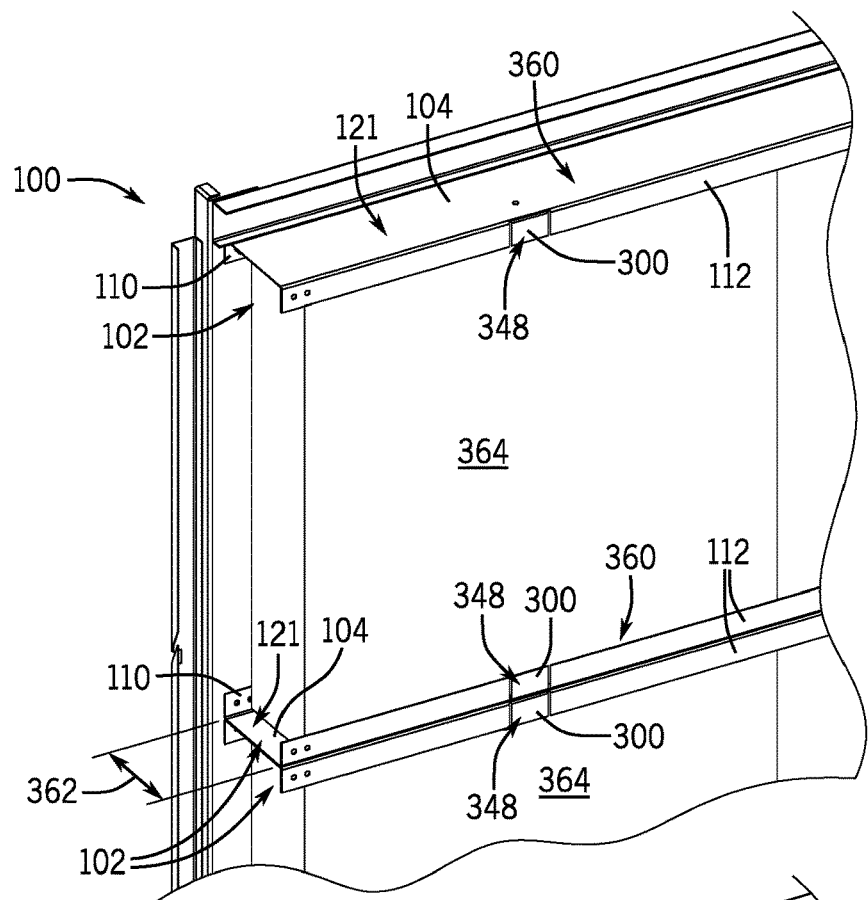
FIG. 20 is a perspective view of an embodiment of the adjustable angle brackets coupled to the plurality of brackets of the second embodiment of the adjustable filter track in a first configuration, in accordance with an aspect of the present disclosure.

For example, FIG. 20 is a perspective view of the plurality of adjustable angle brackets 300 in a first configuration 360. As shown in FIG. 20, each of the first panels 348 of the plurality of adjustable angle brackets 300 is substantially even, flush, and/or aligned with the second bracket 112 of the plurality of filter tracks 104 in the first configuration 360. Accordingly, a depth 362 of the plurality of recesses 102 extends from the first bracket 110 to the second bracket 112 of the plurality of filter tracks 104. As such, the first bracket 110, the second bracket 112, and the plurality of adjustable angle brackets 300 are configured to abut and/or contact a filter 364 disposed within the plurality of recesses 102 to secure the filter 364 in the adjustable filter track system 100, where a depth of the filter 364 is approximately equal to, or slightly less than, the depth 362.

Figure 21:
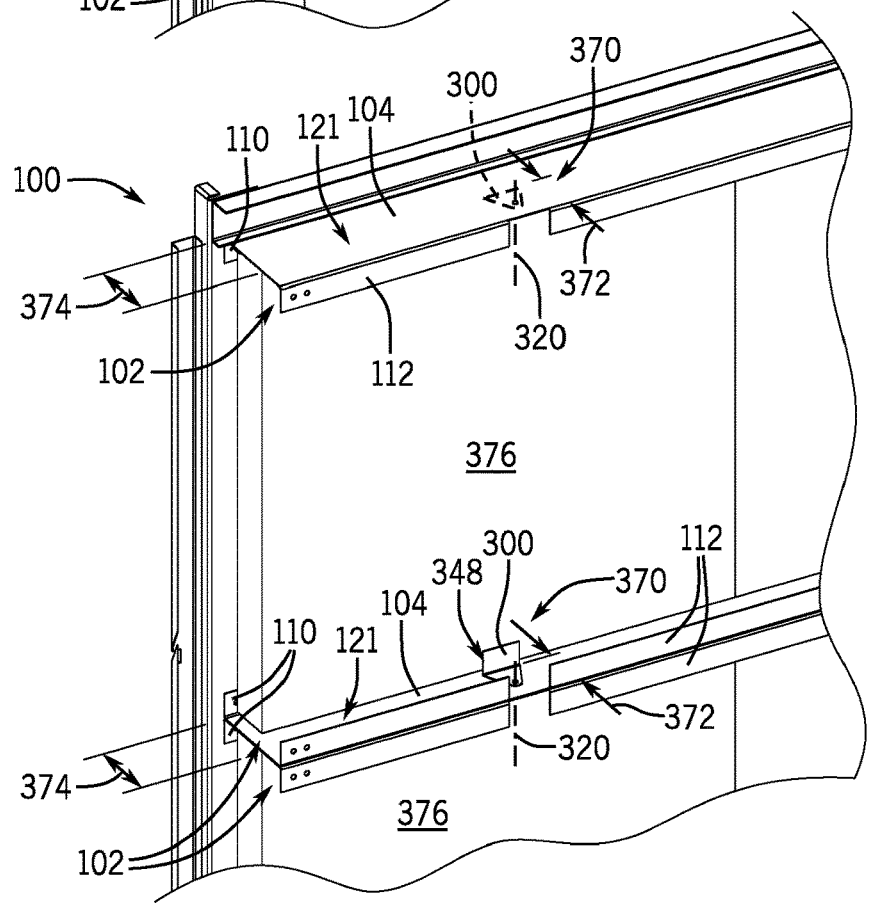
FIG. 21 is a perspective view of an embodiment of the adjustable angle brackets coupled to the plurality of brackets of the second embodiment of the adjustable filter track in a second configuration, in accordance with an aspect of the present disclosure.

FIG. 21 is a perspective view of the plurality of adjustable angle brackets 300 in a second configuration 370. In the second configuration 370, the plurality of adjustable angle brackets 300 is rotated approximately 180 degrees about the axis 320 relative to a position of the adjustable angle brackets 300 in the first configuration 360. As shown in the illustrated embodiment of FIG. 21, the plurality of adjustable angle brackets 300 in the second configuration 370 is substantially aligned in a common direction with the second bracket 112, but is offset from the second bracket 112 by an offset depth 372. Additionally, the plurality of adjustable angle brackets 300 in the second configuration 370 form a depth 374 extending from the first bracket 110 to the respective first panel 348 of each of the plurality of adjustable angle brackets 300. Thus, a filter 376 having a depth substantially similar to, or slightly less than, the depth 374 is configured to contact or abut the first bracket 110 and the first panel 348 of the plurality of adjustable angle brackets 300 when secured in the adjustable filter track system 100 in the second configuration 370. As shown in the illustrated embodiments of FIGS. 20 and 21, the depth 374 of the plurality of filter tracks 104 in the second configuration 370 is less than the depth 362 in the first configuration 360. As such, the adjustable filter track system 100 is configured to receive and secure filters 364, 376 having at least two different sizes or thicknesses depending on whether the plurality of adjustable angle brackets 300 are in the first configuration 360 or the second configuration 370.

Third Embodiment of the Adjustable Filter Track System

Figure 22:
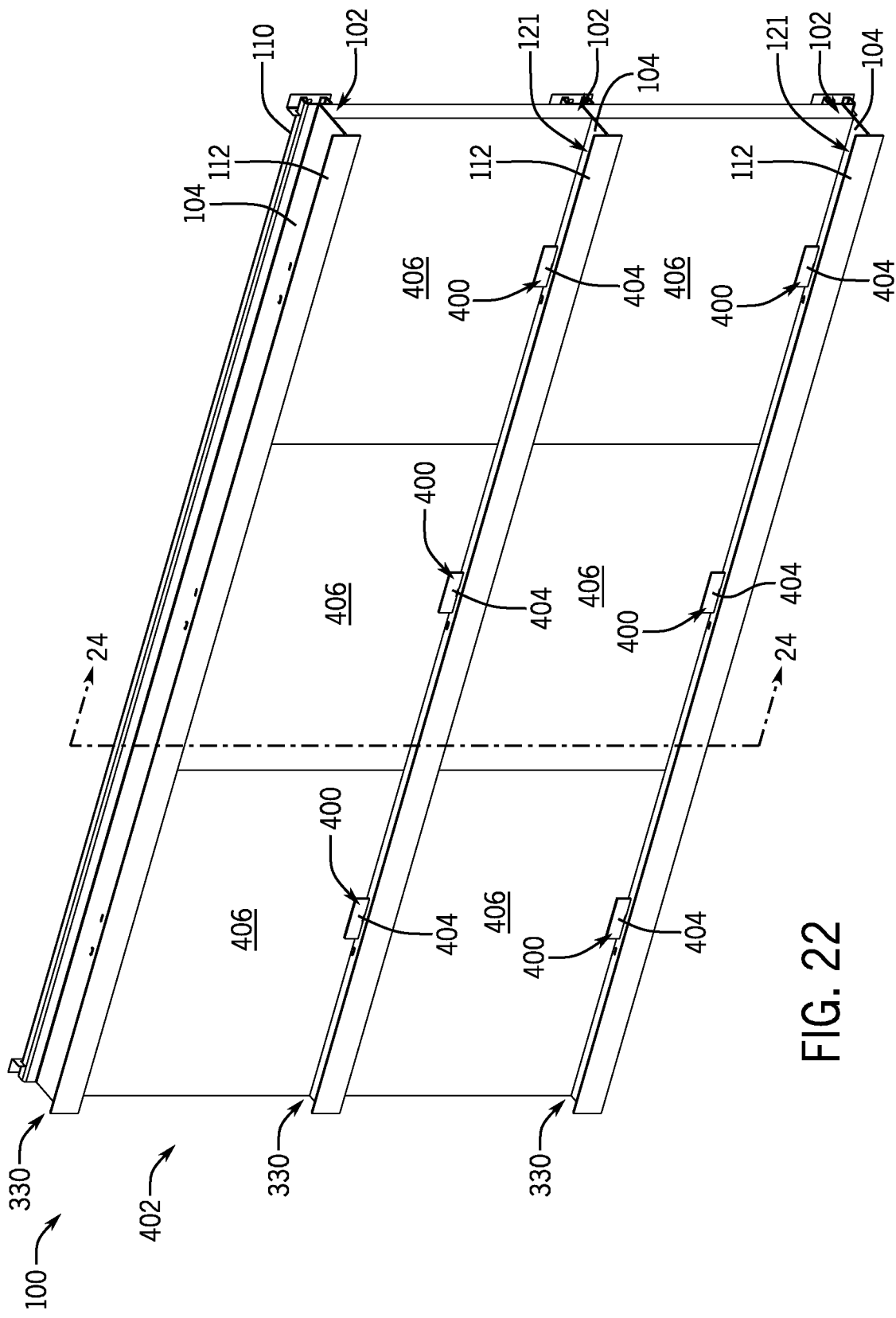
FIG. 22 is a perspective view of a third embodiment of the adjustable filter track having a plurality of inserts disposed within a plurality of receptacles, in accordance with an aspect of the present disclosure.
Figure 23:
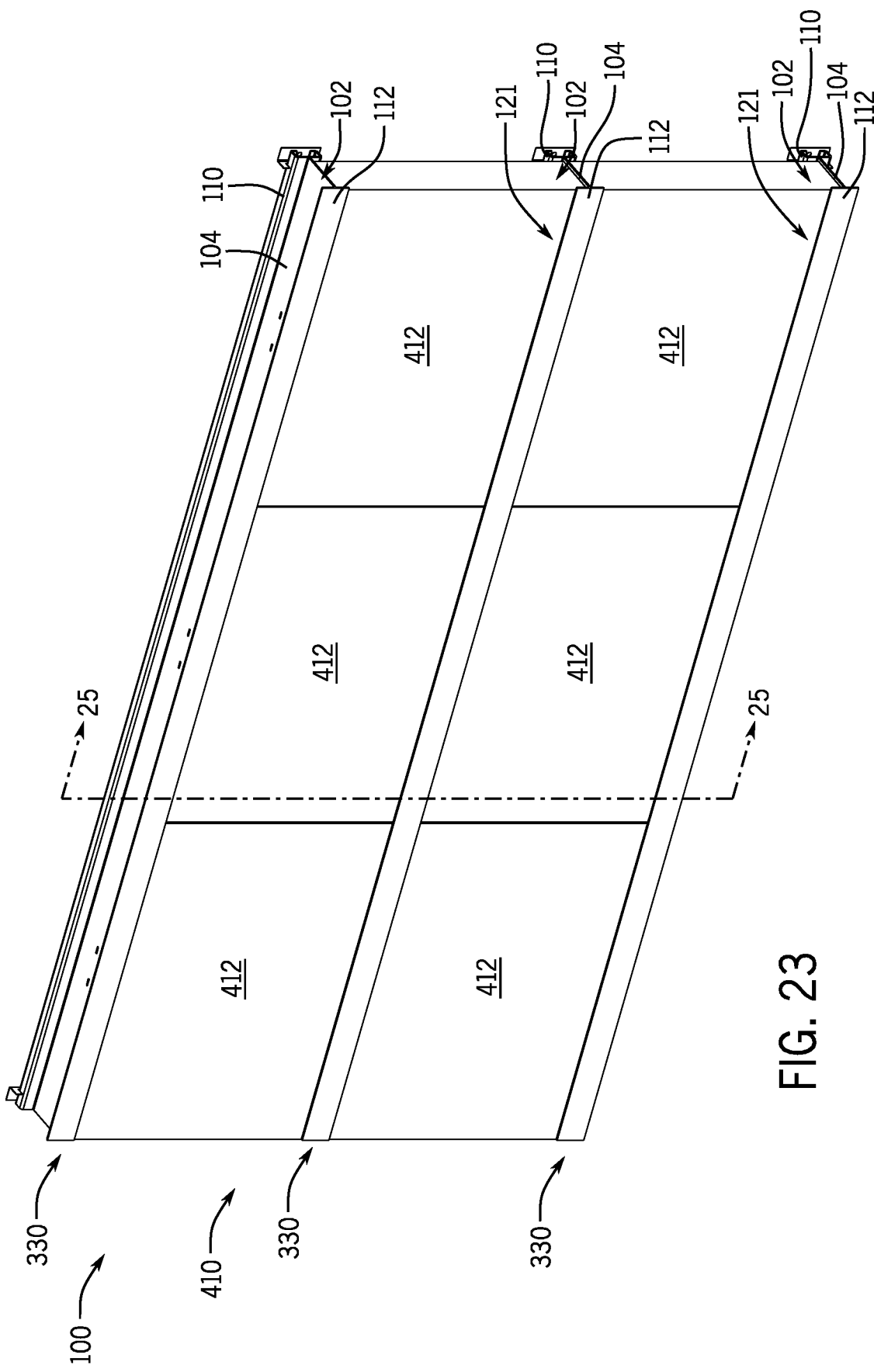
FIG. 23 is a perspective view of the third embodiment of the adjustable filter track with the plurality of inserts removed from the plurality of receptacles, in accordance with an aspect of the present disclosure.

FIG. 22 is a perspective view of an embodiment of the adjustable filter track system 100 that is configured to receive filters having different sizes or thicknesses. As shown in the illustrated embodiment of FIG. 22, the adjustable filter track system 100 includes the plurality of filter tracks 104, which may be coupled to the first strut 106 and the second strut 108 to form the plurality of recesses 102. The plurality of filter tracks 104 may include the first bracket 110, the second bracket 112, and/or the guideway 121 to further form the groove 330 of the plurality of filter tracks 104. Further, the adjustable filter track system 100 shown in FIG. 22 includes a plurality of receptacles 400 extending through the respective guideways 121 of the plurality of filter tracks 104. In a first configuration 402, a plurality of inserts 404 may be inserted into corresponding receptacles 400 of the plurality of receptacles 400 to secure filters 406 within the adjustable filter track system 100. In a second configuration 410, as shown in FIG. 23, the plurality of inserts 404 may be removed from the plurality of receptacles 400 to enable securement of filters 412 within the adjustable filter track system 100. As shown in the illustrated embodiments of FIGS. 22 and 23, the filters 406 may have a reduced size or thickness when compared to the filters 412.

Figure 24:
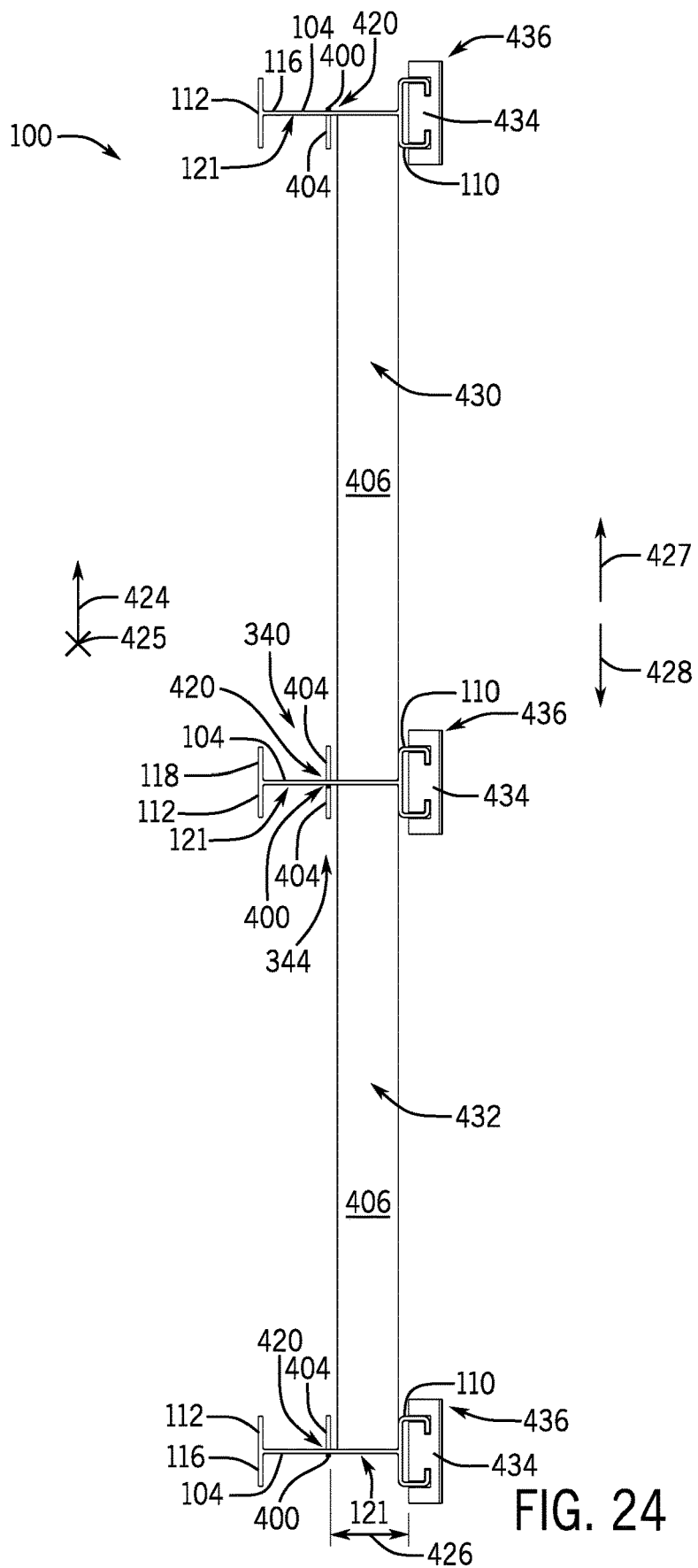
FIG. 24 is a cross-sectional side view of the third embodiment of the adjustable filter track having the plurality of inserts disposed within corresponding receptacles of the plurality of receptacles, in accordance with an aspect of the present disclosure.

FIG. 24 is a side view of an embodiment of the adjustable filter track system 100 with the plurality of inserts 404 in the first configuration 402. As shown in the illustrated embodiment of FIG. 24, the plurality of inserts 404 is disposed within corresponding receptacles 400 of the plurality of receptacles 400. For instance, the plurality of inserts 404 may include securement features 420 that enable the plurality of inserts 404 to be coupled to and extend along an axis 424 transverse to a direction 425 along which the plurality of filter tracks 104 extends. The securement features 420 may include prongs, extensions, tabs, and/or other features that enable the plurality of inserts 404 to be secured within the plurality of receptacles 400 via a friction interference fit, a snap engagement, a screw engagement, or another suitable coupling technique. In some embodiments, the filters 406 are configured to abut and/or contact the plurality of inserts 404 and/or the first bracket 110 to secure the filters 406 in the adjustable filter track system 100. The plurality of inserts 404 and the corresponding receptacles 400 of the plurality of receptacles 400 may be positioned a distance 426 from the first bracket 110 of the plurality of filter tracks 104. The distance 426 corresponds to a size and/or thickness of the filters 406 and enables the filters 406 to be secured within the adjustable filter track system 100.

As shown in the illustrated embodiment of FIG. 24, inserts 404 of the plurality of inserts 404 may be coupled to the first side 340 and the second side 344 of the intermediate filter tracks 118. In other words, the inserts 404 may extend along the axis 424 in a direction 427 from the guideway 121 and a direction 428, opposite the direction 427, from the guideway 121 to secure filters 406 in a first recess 430 of the plurality of recesses 102 and a second recess 432 of the plurality of recesses 102, respectively. Further, inserts 404 of the plurality of inserts 404 may extend from the guideway 121 of the terminal filter tracks 116 in a single direction along the axis 424, thereby extending into a single recess of the plurality of recesses 102.

Further, the first bracket 110 of the plurality of filter tracks 104 may include a C-shaped cross section to enable a plurality of lock plates 434 to be removably coupled to an end 436 or side of the adjustable filter track system 100. In some embodiments, the plurality of filter tracks 104 and/or the plurality of inserts 404 may be formed from a polymeric material. Thus, in order to couple the adjustable filter track system 100 to metallic components of the HVAC system, the plurality of lock plates 434, which may be formed from a polymeric material, a metallic material, or both, may be utilized as an adapter to couple the polymeric filter tracks 104 to a metallic structural component of the HVAC system. In any case, the plurality of lock plates 434 is configured to secure the plurality of filter tracks 104 to a structural component of the HVAC system, such as the struts 106, 108 and/or another suitable component. In some embodiments, the plurality of lock plates 434 configured to be disposed on the end 436 of the adjustable filter track system 100 may be different for the terminal filter tracks 116 and the intermediate filter tracks 118. The plurality of lock plates 434 is discussed in further detail herein with reference to FIGS. 28-33.

Figure 25:
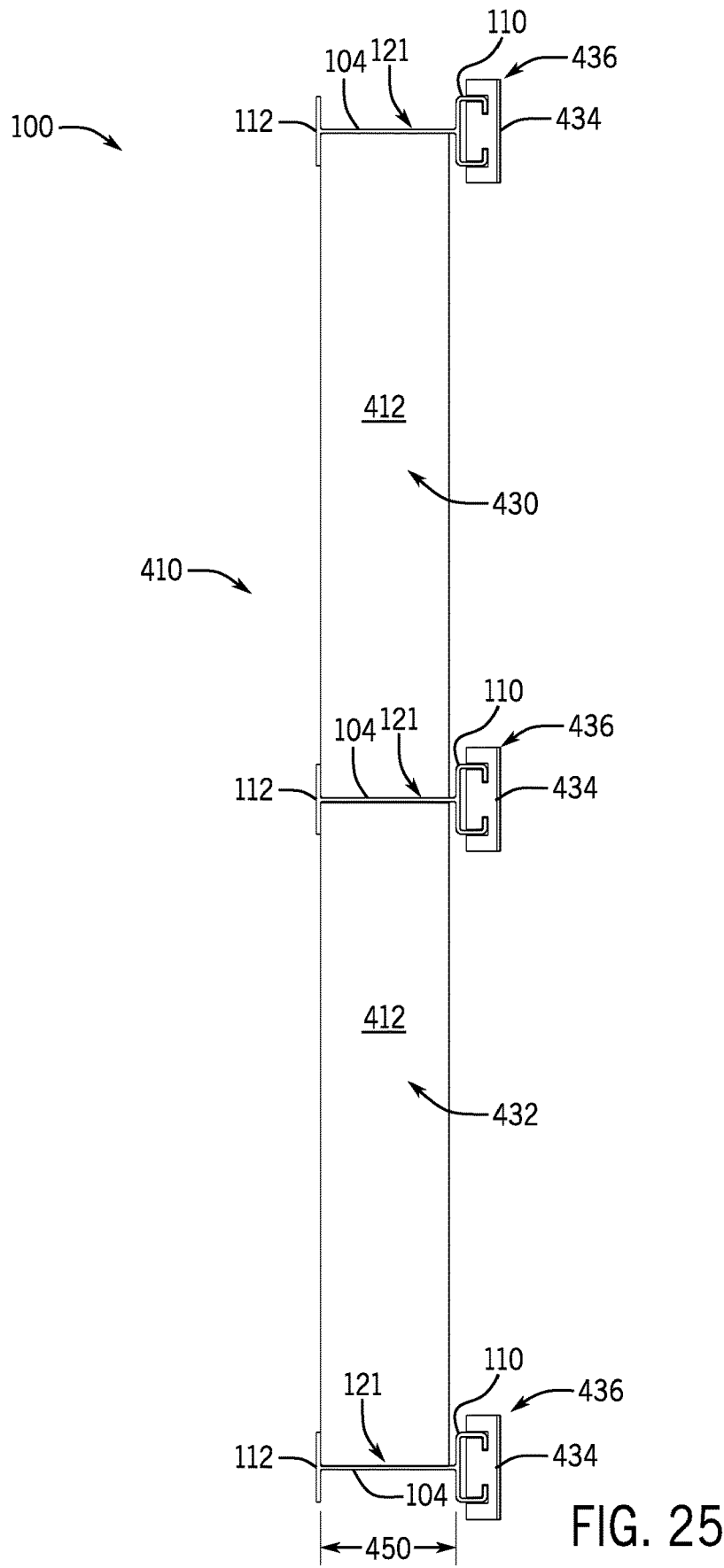
FIG. 25 is a cross-sectional side view of the third embodiment of the adjustable filter track with the plurality of inserts removed from the corresponding receptacles of the plurality of receptacles, in accordance with an aspect of the present disclosure.

FIG. 25 is a side view of an embodiment of the adjustable filter track system 100 with the plurality of inserts 404 removed from the plurality of receptacles 400, and thus, in the second configuration 410. As shown in the illustrated embodiment of FIG. 25, the filters 412 may be disposed within the first recess 430 and the second recess 432. The filters 412 may extend from the first bracket 110 to the second bracket 112 and abut and/or contact both the first bracket 110 and the second bracket 112. As such, the first bracket 110 and the second bracket 112 are configured to secure the filters 412 within the adjustable filter track system 100. In other words, the plurality of inserts 404 are removed from the first recess 430 and the second recess 432 to extend a length 450 of the plurality of recesses 102 to enable the larger filters 412 to be received and secured within the adjustable filter track system 100. Further, the plurality of lock plates 434 may also be disposed at the end 436 of the adjustable filter track system 100 in order to block movement of the filters 412 beyond the end 436 of the adjustable filter track system 100.

Figure 26:
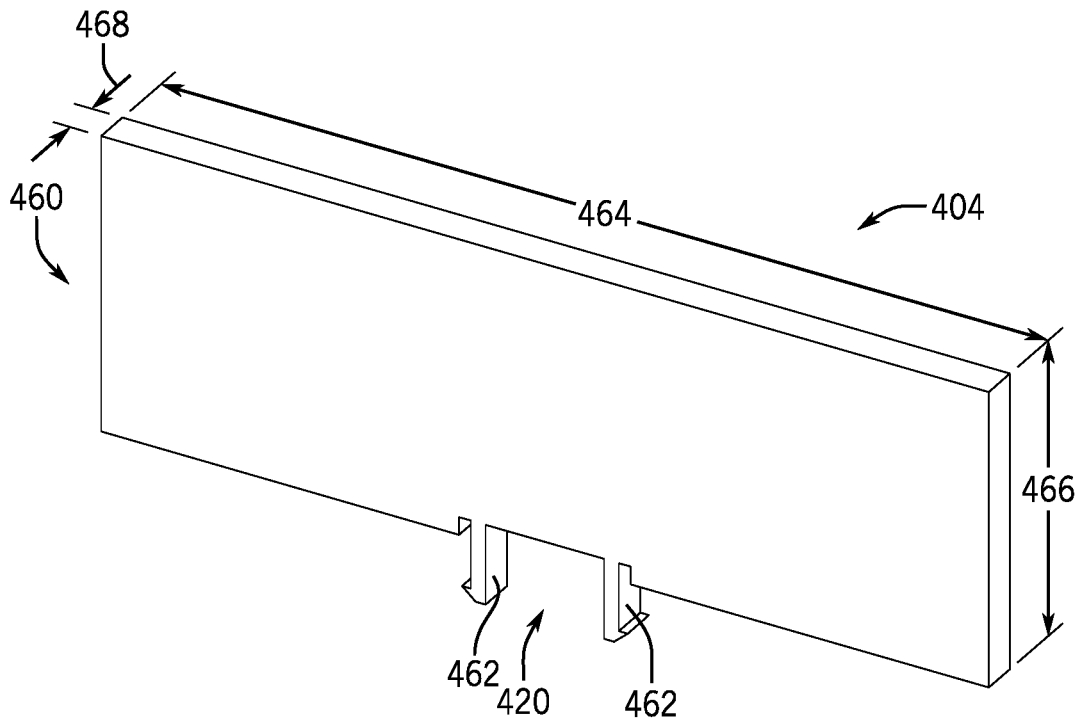
FIG. 26 is a perspective view of an embodiment of an insert of the plurality of inserts for the third embodiment of the adjustable filter track, in accordance with an aspect of the present disclosure.

FIG. 26 is a perspective view of an insert 460 of the plurality of inserts 404. As shown in the illustrated embodiment of FIG. 26, the insert 460 includes the securement feature 420, which includes prongs 462 or extensions configured to be disposed within a corresponding receptacle 400 of the plurality of receptacles 400 in the plurality of filter tracks 104. For instance, the prongs 462 may be configured to be disposed within the corresponding receptacle 400 and engage with a perimeter of the corresponding receptacle 400 to form a friction interference fit or a snap fit. In other embodiments, the insert 460 may include another suitable form of securement feature that couples the insert 460 to the corresponding filter track 104 via the corresponding receptacle 400.

In some embodiments, the insert 460 includes a length 464 and a height 466 that are configured to block the filters 406 from moving outside or beyond the plurality of recesses 102. Additionally, the length 464 and the height 466 may facilitate insertion of the filters 406 into the plurality of recesses 102 defined as a space between the first bracket 110 and the insert 460 in the first configuration 402. Further, the insert 460 may include a thickness 468 that is configured to enable the insert 460 to have a predetermined rigidity that may enable the insert 460 to maintain a position within the corresponding receptacle 400 despite any forces exerted on the insert 460 by the filters 406. In some cases, the insert 460 may be removed from the corresponding receptacle 400 via a tool or an application of force by an operator. However, the insert 460 is configured to maintain a connection with the respective filter track 104 upon application of any forces on the insert 460 by the filters 406.

Figure 27:
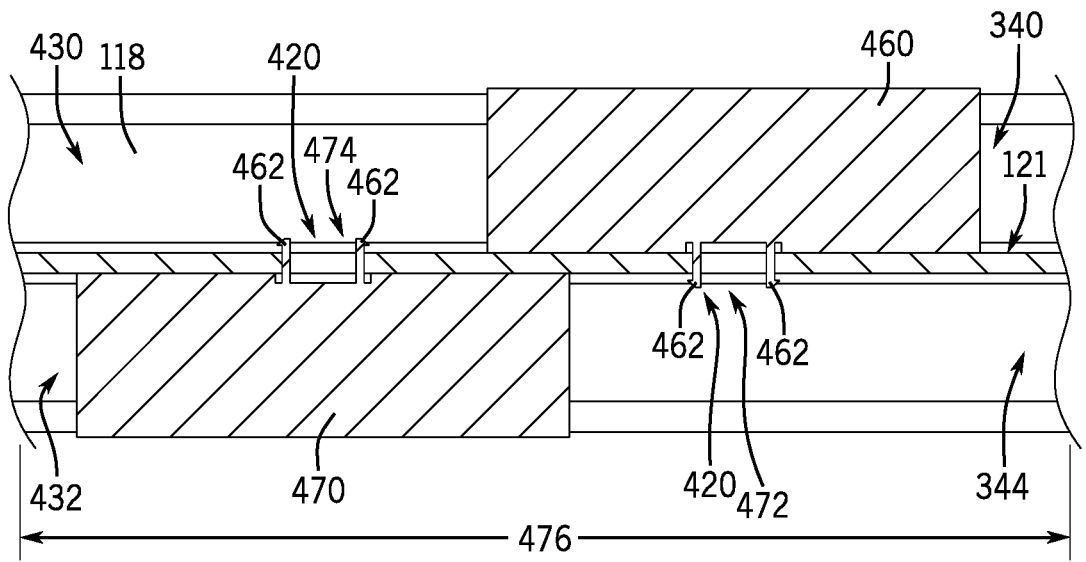
FIG. 27 is a side view of an embodiment of two inserts of the plurality of inserts secured within corresponding receptacles of the plurality of receptacles of the third embodiment of the adjustable filter track, in accordance with an aspect of the present disclosure.

FIG. 27 is a side view of an embodiment of the insert 460 and an additional insert 470 disposed within the intermediate filter track 118. As shown in the illustrated embodiment of FIG. 27, a first receptacle 472 configured to receive the insert 460 and a second receptacle 474 configured to receive the additional insert 470 may be offset from one another with a respect to a length 476 of the intermediate filter track 118. Accordingly, the insert 460 extending from the first side 340 of the guideway 121 and the additional insert 470 extending from the second side 344 of the guideway 121 are not disposed within the same opening or at the same position along the length 476 of the intermediate filter track 118. The insert 460 may be configured to partially form the first recess 430, and the additional insert 470 may be configured to partially form the second recess 432 without interference from one another or other inserts 404. In some embodiments, the first receptacle 472 and the second receptacle 474 may include substantially the same configuration as one another. As such, the plurality of inserts 404 may be disposed within the plurality of receptacles 400 from the first side 340 of the guideway 121 and the second side 344 of the guideway 121.

Figure 28:
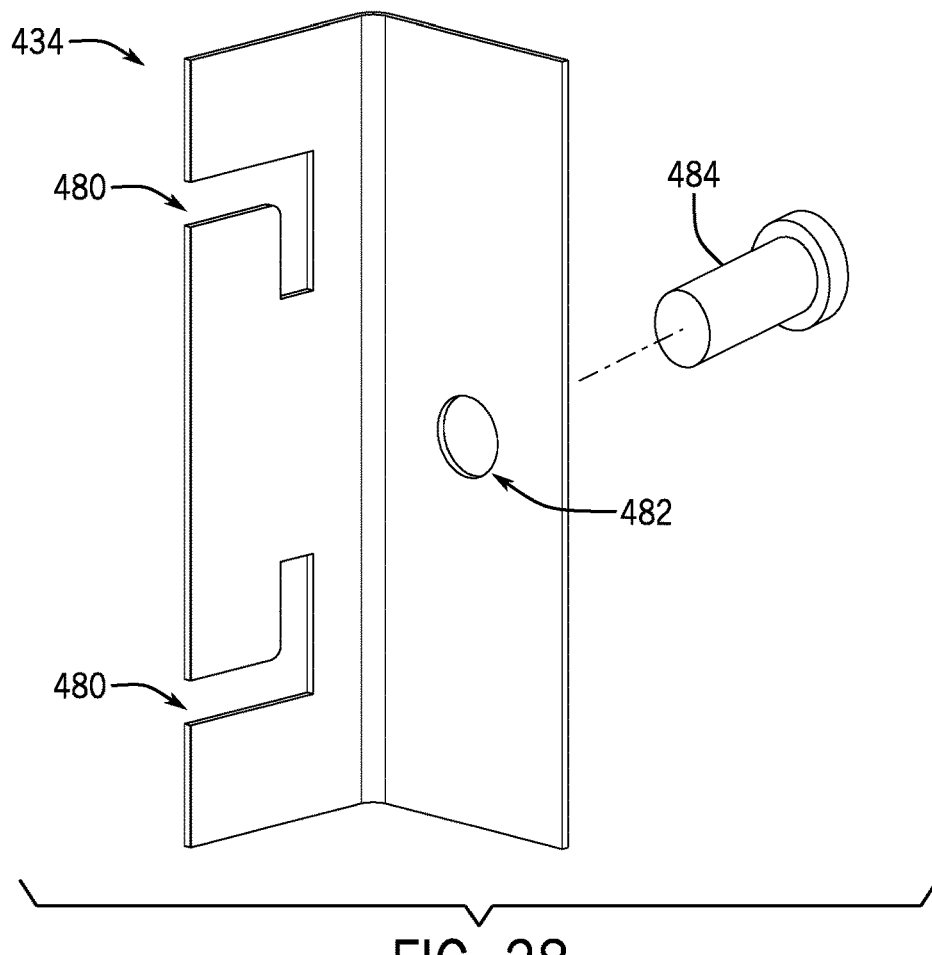
FIG. 28 is a perspective view of an embodiment of a lock plate of the third embodiment of the adjustable filter track of FIGS. 22-25, in accordance with an aspect of the present disclosure.

FIG. 28 is a perspective view of an embodiment of the lock plate 434 configured to be coupled to the end 436 of the adjustable filter track system 100. As shown in the illustrated embodiment of FIG. 28, the lock plate 434 includes grooves 480 configured to be coupled to the C-shaped cross section of the first bracket 110 of the plurality of filter tracks 104, such as the intermediate filter tracks 118. The grooves 480 correspond to the shape and/or geometry of the filter track 104 in order to enable the lock plate 434 to be snapped onto or otherwise coupled to the filter track 104. Additionally, the lock plate 434 includes an opening 482 configured to receive a fastener 484 that couples the filter track 104 and the lock plate 434 to a structural component of the HVAC system, such as the struts 106, 108 and/or another suitable component.

Figure 29:
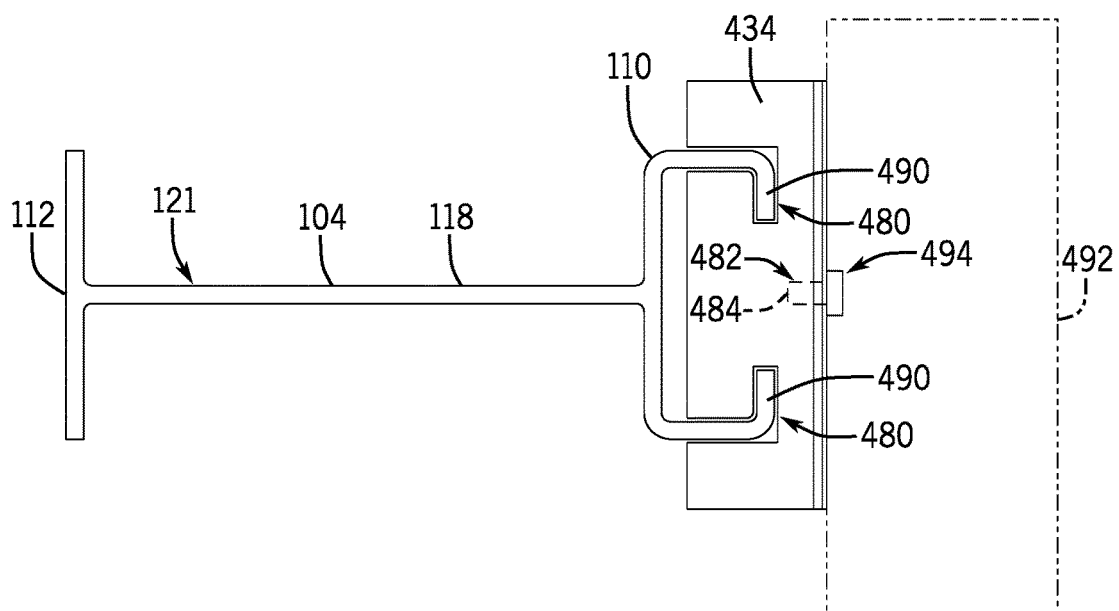
FIG. 29 is a cross-sectional side view of an embodiment of the lock plate coupled to a bracket of the third embodiment of the adjustable filter track of FIGS. 22-25, in accordance with an aspect of the present disclosure.

FIG. 29 is a side view of the lock plate 434 coupled to a respective filter track 104, and specifically, to an intermediate filter track 118. The grooves 480 of the lock plate 434 are disposed over flanges 490 of the first bracket 110 of the respective filter track 104 to secure the lock plate 434 to the filter track 104. Additionally, the lock plate 434 may be coupled to a component 492, such as a structural component of an HVAC system, via the fastener 484 extending through the opening 482 and a corresponding opening 494 of the component 492.

As set forth above, the terminal filter tracks 116 and/or the lock plates 434 for the terminal filter tracks 116 may include a different configuration than the intermediate filter tracks 118 and/or the lock plates 434 for the intermediate filter tracks 118. For instance, FIG. 30 is a perspective view of an embodiment of a terminal filter track 500 configured to be utilized with the adjustable filter track system 100 of FIGS. 22-25. As shown in the illustrated embodiment of FIG. 30, the terminal filter track 500 includes the first bracket 110, the second bracket 112, and the guideway 121. The configuration of the first bracket 110 is different from the configuration of the first bracket 110 of the intermediate filter track 118. For instance, the first bracket 110 of the terminal filter track 116 may include a substantially J-shaped cross section as opposed to the first bracket 110 of the intermediate filter track 118, which included a substantially C-shaped cross section. The J-shaped cross section of the first bracket 110 may enable the terminal filter track 116 to lay substantially flush against a flat surface, such as the ground and/or a housing of an HVAC system. In other embodiments, the cross-sectional geometry of the terminal filter track 116 may include another suitable configuration.

FIG. 31 is a cross-sectional side view of an embodiment of the terminal filter track 500. A show in the illustrated embodiment of FIG. 31, the first bracket 110 of the terminal filter track 500 includes a substantially J-shaped cross-section 508 that may enable a lock plate 434 of the plurality of lock plates 434 to be coupled thereto. Additionally, the plurality of receptacles 400 for the terminal filter track 500 may not extend entirely through the guideway 121. For instance, the plurality of receptacles 400 for the terminal filter track 500 may extend a depth 510 into the guideway 121 that is less than a thickness 512 of the terminal filter track 500. Accordingly, the securement features 420 of the plurality of inserts 404 may be configured to be secured by the plurality of receptacles 400 without extending through the entire guideway 121 of the terminal filter track 500.

FIG. 32 is a perspective view of an embodiment of a lock plate 520 that may be coupled to and/or utilized with the terminal filter track 500. The lock plate 520 includes a single groove 522 that is configured to be secured to the J-shaped cross-section 508 of the first bracket 110 of the terminal filter track 500. In other embodiments, the groove 522 may include another suitable configuration that conforms to a cross-sectional geometry of the first bracket 110 of the terminal filter track 500. Additionally, the lock plate 520 includes an opening 524 that is configured to receive a fastener 526 and secure the terminal filter track 500, as well as the lock plate 520, to a component of an HVAC system, such as the struts 106, 108 or another suitable component.

FIG. 33 is a cross-sectional side view of an embodiment of the terminal filter track 500 having the lock plate 520 and an insert 530 coupled thereto. As shown in the illustrated embodiment of FIG. 33, the groove 522 of the lock plate 520 receives a flanged portion 532 of the first bracket 110 of the terminal filter track 500. The lock plate 520 may be snapped onto or otherwise coupled to the first bracket 110 of the terminal filter track 500, which may then enable the terminal filter track 500 to be coupled to the component 492. Additionally, the securement features 420 of the insert 530 extend into the corresponding receptacle 400 and couple the insert 530 to the terminal filter track 500 via a friction interference fit, a snap engagement, a screw engagement, or via another suitable coupling technique.

As set forth above, embodiments of the present disclosure may provide one or more technical effects useful in reducing costs of manufacturing of an HVAC system. For example, embodiments of the present disclosure are directed to an adjustable filter track configured to have a plurality of configurations, where each configuration of the plurality of configurations is configured to receive a different sized filter. In some cases, the adjustable filter track includes a plurality of filter tracks configured to couple to first and second coupling features of first and second struts at different positions. Coupling the plurality of filter tracks to the first and second struts at different positions may adjust a length or distance of a plurality of recesses formed by the plurality of filter tracks and the first and second struts, thereby enabling the adjustable filter track to switch between configurations. Additionally or alternatively, the adjustable filter track may include a plurality of adjustable angle brackets configured to rotate within the plurality of recesses. The plurality of adjustable angle brackets may adjust the length or distance of the plurality of recesses, thereby enabling filters of different sizes to be received and secured within the adjustable filter track. Further still, the adjustable filter track may include a plurality of receptacles extending into the plurality of filter tracks and configured to receive a plurality of inserts. The adjustable filter track may be configured to receive and secure a first sized filter when the plurality of inserts is secured in the corresponding receptacles and configured to receive and secure a second sized filter, different than the first sized filter, when the plurality of inserts is removed from the corresponding receptacles. In any case, the adjustable filter track is configured to receive and secure a plurality of filters having different sizes to reduce an amount of components manufactured for the HVAC system. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An adjustable filter track system for a heating, ventilation, and/or air conditioning (HVAC) system, comprising:
   a filter track including a guideway and a bracket that form a recess configured to receive a first filter in a first configuration of the adjustable filter track system;
   a plurality of receptacles formed in the guideway and aligned along a length of the guideway; and
   a plurality of inserts, wherein, in a second configuration of the adjustable filter track system, each insert of the plurality of inserts is configured to be disposed in a corresponding receptacle of the plurality of receptacles and extend outwardly from the guideway to secure a second filter between the plurality of inserts and the bracket, wherein the second filter has a different thickness than the first filter.

2. The adjustable filter track system of claim 1, wherein the filter track and the plurality of inserts include a polymeric material.

3. The adjustable filter track system of claim 1, wherein each insert of the plurality of inserts is configured to engage the corresponding receptacle of the plurality of receptacles via an interference fit, a snap engagement, or a screw engagement.

4. The adjustable filter track system of claim 3, wherein each insert of the plurality of inserts includes a pair of prongs configured to engage with the corresponding receptacle of the plurality of receptacles via the interference fit, the snap engagement, or the screw engagement.

5. The adjustable filter track system of claim 1, comprising a lock plate configured to be disposed at an end of the filter track, wherein the lock plate is configured to prevent the first filter and the second filter from sliding beyond the end of the filter track.

6. The adjustable filter track system of claim 1, wherein the filter track is an I-beam formed by the bracket, an additional bracket, and the guideway.

7. The adjustable filter track system of claim 6, wherein the additional bracket includes a C-shaped cross-section.

8. The adjustable filter track system of claim 7, comprising a lock plate including a first panel and a second panel arranged in an L-shape, wherein the first panel includes a pair of grooves configured slide along the C-shaped cross-section of the additional bracket.

9. The adjustable filter track system of claim 1, comprising an additional plurality of inserts configured to engage with the plurality of receptacles and/or with an additional plurality of receptacles on an opposite side of the guideway from the plurality of inserts to facilitate securement of a third filter between the additional plurality of inserts and the bracket or an additional bracket.

10. The adjustable filter track system of claim 1, comprising an additional filter track including an additional guideway and an additional bracket that form an additional recess, wherein the bracket of the filter track and the additional bracket of the additional filter track are configured to be coupled to a strut.

11. The adjustable filter track system of claim 10, wherein the additional filter track includes a C-shaped cross-section formed by the additional bracket, an outer bracket, and the additional guideway.

12. The adjustable filter track system of claim 11, wherein the additional bracket of the additional filter track is coupled to an end of the strut, and wherein the outer bracket of the additional filter track comprises a J-shaped cross-section.

13. The adjustable filter track system of claim 12, comprising a lock plate including a first panel and a second panel arranged in an L-shape, wherein the first panel includes a groove configured slide along the J-shaped cross-section of the outer bracket.

14. The adjustable filter track system of claim 11, wherein the additional filter track includes an additional plurality of receptacles formed in the additional guideway, and wherein the additional plurality of receptacles extend a depth into the additional guideway.

15. The adjustable filter track system of claim 14, wherein the depth is less than a thickness of the additional guideway of the additional filter track.

16. An adjustable filter track system, comprising:
   a plurality of filter tracks each including a guideway disposed between a first bracket and a second bracket, wherein the first bracket and the second bracket extend in a direction transverse to the guideway and are configured to retain a first filter therebetween in a first configuration of the adjustable filter track system;
   a plurality of receptacles formed in corresponding guideways of the plurality of filter tracks; and
   a plurality of inserts, wherein, in a second configuration of the adjustable filter track system, each insert of the plurality of inserts is configured to be disposed in a corresponding receptacle of the plurality of receptacles and extend outwardly from the corresponding guideway of the plurality of filter tracks in the direction transverse to the corresponding guideway to secure a second filter between the respective insert and the corresponding first bracket.

17. The adjustable filter track system of claim 16, wherein the plurality of filter tracks is spaced uniformly along a length of a strut.

18. The adjustable filter track system of claim 16, wherein each first bracket of the plurality of filter tracks has a C-shaped cross section or a J-shaped cross section configured to facilitate coupling between the respective first bracket of the plurality of filter tracks and grooves of corresponding lock plates of a plurality of lock plates.

19. The adjustable filter track system of claim 18, comprising the plurality of lock plates, wherein each lock plate of the plurality of lock plates includes an opening configured to facilitate coupling each lock plate of the plurality of lock plates to a strut via mechanical fasteners.

20. The adjustable filter track system of claim 16, wherein a first insert of the plurality of inserts is configured to extend outwardly from a first side of a first guideway of the plurality of filter tracks, and wherein a second insert of the plurality of inserts is configured to extend outwardly from a second side of the first guideway of the plurality of filter tracks, opposite the first side.

21. An adjustable filter track system, comprising:
a plurality of inserts, each insert of the plurality of inserts having a securement feature configured to facilitate coupling of the respective insert to corresponding receptacles of a plurality of receptacles extending through a guideway of a filter track, wherein each insert of the plurality of inserts is configured to extend outwardly from the guideway of the filter track in a direction transverse to a length of the guideway to secure a filter between the respective insert and a bracket of the filter track.

22. The adjustable filter track system of claim 21, wherein the securement feature includes a pair of prongs configured to extend into the corresponding receptacles of the plurality of receptacles.

23. The adjustable filter track system of claim 22, wherein the pair of prongs is configured to facilitate coupling of the corresponding insert of the plurality of inserts within the corresponding receptacles of the plurality of receptacles via an interference fit, a snap engagement, or a screw engagement.

24. The adjustable filter track system of claim 21, wherein a first insert of the plurality of inserts is configured to extend outwardly from a first side of the guideway of the filter track, and a second insert of the plurality of inserts is configured to extend outwardly from a second side, opposite the first side, of the guideway of the filter track.

25. The adjustable filter track system of claim 24, wherein a first set of receptacles of the plurality of receptacles is configured to receive the first insert of the plurality of inserts, a second set of receptacles of the plurality of receptacles is configured to receive the second insert of the plurality of inserts, and the first set of receptacles and the set of second receptacles are offset from one another with respect to the length of the guideway.

* * * * *